(12) United States Patent
Nomura et al.

(10) Patent No.: US 11,977,314 B2
(45) Date of Patent: May 7, 2024

(54) OPTICAL DEVICE, PHOTODETECTION SYSTEM, AND METHOD FOR MANUFACTURING THE SAME

(71) Applicant: Panasonic Intellectual Property Management Co., Ltd., Osaka (JP)

(72) Inventors: Takaiki Nomura, Osaka (JP); Masahiko Tsukuda, Osaka (JP); Yasuhisa Inada, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 66 days.

(21) Appl. No.: 17/483,643

(22) Filed: Sep. 23, 2021

(65) Prior Publication Data
US 2022/0011404 A1   Jan. 13, 2022

Related U.S. Application Data

(63) Continuation of application No. PCT/JP2020/004775, filed on Feb. 7, 2020.

(30) Foreign Application Priority Data

Apr. 25, 2019   (JP) ................................ 2019-084558

(51) Int. Cl.
*G02B 6/12* (2006.01)
*G01S 7/481* (2006.01)
(Continued)

(52) U.S. Cl.
CPC .......... *G02F 1/2955* (2013.01); *G01S 7/4817* (2013.01); *G02B 6/12* (2013.01);
(Continued)

(58) Field of Classification Search
CPC .......... G02F 1/2955; G02F 1/035; G02F 1/13; G02F 1/1326; G02F 1/1339;
(Continued)

(56) References Cited

U.S. PATENT DOCUMENTS 5,454,055 A    9/1995 Kragl et al.
10,877,215 B2 * 12/2020 Hashiya ............. G02B 26/0875
(Continued)

FOREIGN PATENT DOCUMENTS

EP    32878341 A1    2/2018
JP    3-110527       5/1991
(Continued)

OTHER PUBLICATIONS

Chiba, Machine Translation of JP-4697698-B2, Jun. 2011. (Year: 2011).*

(Continued)

*Primary Examiner* — Michelle R Connelly
(74) *Attorney, Agent, or Firm* — Rimon P.C.

(57) ABSTRACT

An optical device includes a first substrate having a first surface, a second substrate having a second surface, at least one optical waveguide, and a plurality of spacers, disposed on at least either the first surface or the second surface, that include a first portion and a second portion. The first portion of the plurality of elastic spacers is at least one elastic spacer located in a region between the first substrate and the second substrate in which the first substrate and the second substrate overlap each other as seen from an angle parallel with a direction perpendicular to the first surface. The second portion of the plurality of elastic spacers is at least one elastic spacer located in a region in which the first substrate and the second substrate do not overlap each other as seen from an angle parallel with the direction perpendicular to the first surface.

14 Claims, 18 Drawing Sheets

(51) Int. Cl.
*G02B 6/122* (2006.01)
*G02B 27/00* (2006.01)
*G02F 1/035* (2006.01)
*G02F 1/13* (2006.01)
*G02F 1/1339* (2006.01)
*G02F 1/137* (2006.01)
*G02F 1/29* (2006.01)
*G02F 1/295* (2006.01)
*G01S 17/08* (2006.01)
*G02B 6/124* (2006.01)
*G02B 6/125* (2006.01)

(52) U.S. Cl.
CPC ......... *G02B 6/122* (2013.01); *G02B 27/0087* (2013.01); *G02F 1/035* (2013.01); *G02F 1/13* (2013.01); *G02F 1/1326* (2013.01); *G02F 1/1339* (2013.01); *G02F 1/13394* (2013.01); *G02F 1/137* (2013.01); *G02F 1/292* (2013.01); *G02F 1/295* (2013.01); *G01S 7/481* (2013.01); *G01S 17/08* (2013.01); *G02B 6/12004* (2013.01); *G02B 2006/121* (2013.01); *G02B 2006/12104* (2013.01); *G02B 2006/12107* (2013.01); *G02B 2006/12138* (2013.01); *G02B 6/124* (2013.01); *G02B 6/125* (2013.01); *G02F 2201/06* (2013.01); *G02F 2201/066* (2013.01); *G02F 2201/302* (2013.01)

(58) Field of Classification Search
CPC ...... G02F 1/13394; G02F 1/137; G02F 1/292; G02F 1/295; G02F 2201/06; G02F 2201/066; G02F 2201/302; G01S 7/4817; G01S 7/481; G01S 17/08; G01S 7/4863; G02B 6/12; G02B 6/122; G02B 27/0087; G02B 6/12004; G02B 6/124; G02B 6/125; G02B 2006/121; G02B 2006/12104; G02B 2006/12107; G02B 2006/12138; G02B 6/424
See application file for complete search history.

(56) References Cited

U.S. PATENT DOCUMENTS

| | | | |
|---|---|---|---|
| 10,901,293 B1 * | 1/2021 | Guo | ..................... G01S 7/4817 |
| 11,092,691 B2 * | 8/2021 | Shim | ....................... G01S 17/34 |
| 2004/0005111 A1 | 1/2004 | Ishikawa et al. | |
| 2016/0026019 A1 | 1/2016 | Choi et al. | |
| 2018/0224709 A1 | 8/2018 | Inada et al. | |
| 2018/0372951 A1 | 12/2018 | Hashiya et al. | |
| 2019/0033574 A1 | 1/2019 | Inada et al. | |
| 2021/0149136 A1 * | 5/2021 | Nomura | .................... G02B 6/12 |
| 2021/0325762 A1 * | 10/2021 | Lee | ......................... G02F 1/292 |
| 2022/0011404 A1 | 1/2022 | Nomura et al. | |
| 2022/0037786 A1 * | 2/2022 | Lipson | ............... G02B 27/0087 |

FOREIGN PATENT DOCUMENTS

| | | |
|---|---|---|
| JP | 11-064859 | 3/1999 |
| JP | 2002-048986 | 2/2002 |
| JP | 2005-141066 A | 6/2005 |
| JP | 2005-266254 | 9/2005 |
| JP | 2008-225082 | 9/2008 |
| JP | 2008-233242 | 10/2008 |
| JP | 2010-002664 | 1/2010 |
| JP | 4697698 B2 * | 6/2011 |
| JP | 2013-016591 | 1/2013 |
| JP | 2016-508235 | 3/2016 |
| JP | 2018-128663 | 8/2018 |
| JP | 2019-028438 | 2/2019 |
| WO | 2013/168266 | 11/2013 |
| WO | 2014/110017 | 7/2014 |
| WO | 2018/061515 | 4/2018 |

OTHER PUBLICATIONS

International Search Report of PCT application No. PCT/JP2019/024407 dated Jul. 16, 2019.
International Search Report of PCT application No. PCT/JP2020/004775 dated Mar. 31, 2020.
European Search Report dated Apr. 25, 2022 for the related European Patent Application No. 20794084.2.

* cited by examiner

OPTICAL DEVICE, PHOTODETECTION SYSTEM, AND METHOD FOR MANUFACTURING THE SAME

BACKGROUND

1. Technical Field

The present disclosure relates to an optical device, a photodetection system, and a method for manufacturing the same.

2. Description of the Related Art

There have conventionally been proposed various types of device that are capable of scanning space with light.

International Publication No. 2013/168266 discloses a configuration in which an optical scan can be performed with a mirror-rotating driving apparatus.

Japanese Unexamined Patent Application Publication (Translation of PCT Application) No. 2016-508235 discloses an optical phased array having a plurality of two-dimensionally arrayed nanophotonic antenna elements. Each antenna element is optically coupled to a variable optical delay line (i.e. a phase shifter). In this optical phased array, a coherent light beam is guided to each antenna element by a waveguide, and the phase of the light beam is shifted by the phase shifter. This makes it possible to vary the amplitude distribution of a far-field radiating pattern.

Japanese Unexamined Patent Application Publication No. 2013-16591 discloses an optical deflection element including: a waveguide including an optical waveguide layer through the inside of which light is guided and first distributed Bragg reflectors formed on upper and lower surfaces, respectively, of the optical waveguide layer; a light entrance through which light enters the waveguide, and a light exit formed on a surface of the waveguide to let out light having entered through the light entrance and being guided through the inside of the waveguide.

SUMMARY

One non-limiting and exemplary embodiment provides a novel optical device including an optical waveguide with high dimensional accuracy.

Solution to Problem

In one general aspect, the techniques disclosed here feature an optical device including a first substrate having a first surface spreading along a first direction and a second direction intersecting the first direction, a second substrate having a second surface that at least partially faces the first surface, at least one optical waveguide extending along the first direction between the first substrate and the second substrate, and a plurality of spacers, disposed on at least either the first surface or the second surface, that include a first portion and a second portion. The second surface has a different area from an area of the first surface. The first portion of the plurality of elastic spacers is at least one elastic spacer located in a region between the first substrate and the second substrate in which the first substrate and the second substrate overlap each other as seen from an angle parallel with a direction perpendicular to the first surface. The second portion of the plurality of elastic spacers is at least one elastic spacer located in a region in which the first substrate and the second substrate do not overlap each other as seen from an angle parallel with the direction perpendicular to the first surface.

It should be noted that general or specific embodiments may be implemented as a device, a system, a method, or any selective combination thereof.

One aspect of the present disclosure makes it possible to provide a novel optical device including an optical waveguide with high dimensional accuracy.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
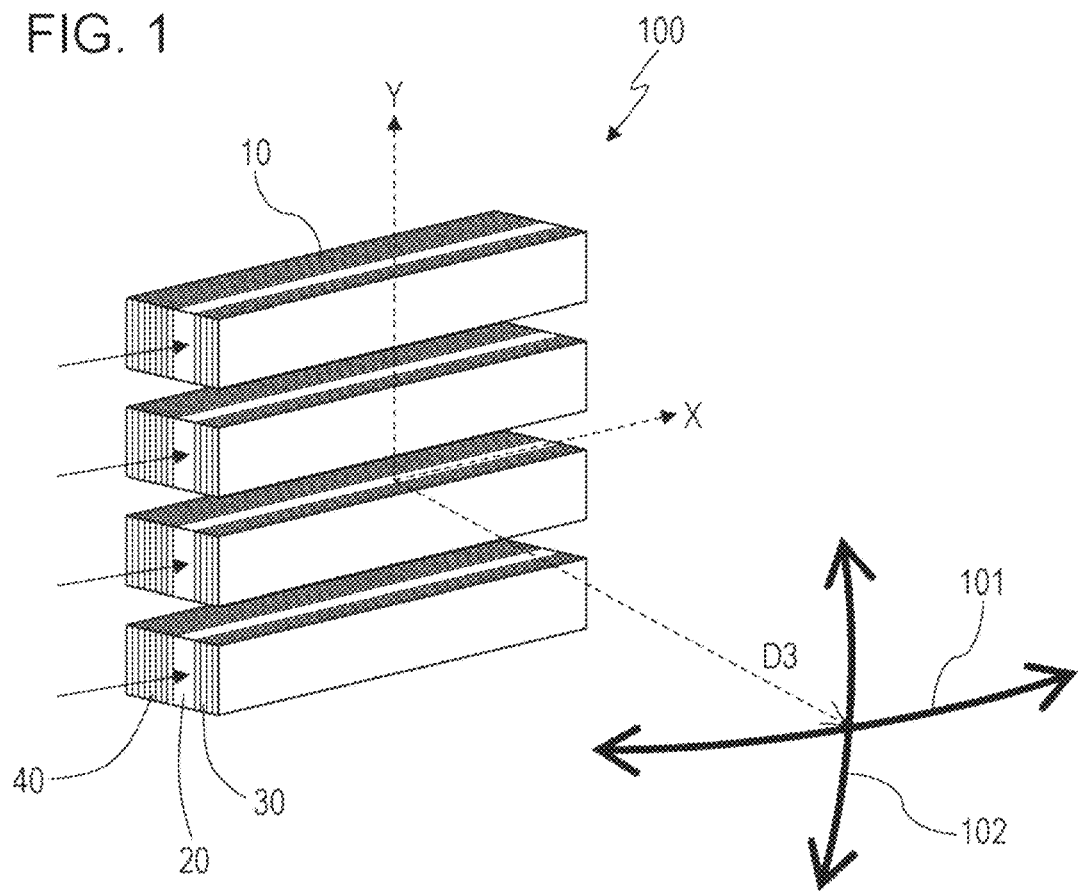
FIG. 1 is a perspective view schematically showing a configuration of an optical scan device.

The phrase "at least one of the refractive index, the thickness, or the wavelength" herein means at least one selected from the group consisting of the refractive index of an optical waveguide layer, the thickness of an optical waveguide layer, and the wavelength of light that is inputted to an optical waveguide layer. For a change in direction of emission of light, any one of the refractive index, the thickness, and the wavelength may be controlled alone. Alternatively, the direction of emission of light may be changed by controlling any two or all of these three. In each of the following embodiments, the wavelength of light that is inputted to the optical waveguide layer may be controlled instead of or in addition to controlling the refractive index or the thickness.

The foregoing fundamental principles are similarly applicable to uses in which optical signals are received as well as uses in which light is emitted. The direction of light that can be received can be one-dimensionally changed by changing at least one of the refractive index, the thickness, or the wavelength. Furthermore, the direction of light that can be received can be two-dimensionally changed by changing a phase difference of light through a plurality of phase shifters connected separately to each of a plurality of unidirectionally-arrayed waveguide elements.

An optical scan device and an optical receiver device of the present disclosure may be used, for example, as an antenna in a photodetection system such as a LiDAR (light detection and ranging) system. The LiDAR system, which involves the use of short-wavelength electromagnetic waves (visible light, infrared radiation, or ultraviolet radiation), can detect a distance distribution of objects with higher resolution than a radar system that involves the use of radio waves such as millimeter waves. Such a LiDAR system is mounted, for example, on a movable body such as an automobile, a UAV (unmanned aerial vehicle, i.e. a drone), or an AGV (automated guided vehicle), and may be used as one of the crash avoidance technologies. The optical scan device and the optical receiver device are herein sometimes collectively referred to as "optical device". Further, a device that is used in the optical scan device or the optical receiver device is sometimes referred to as "optical device", too.

Example Configuration of Optical Scan Device

The following describes, as an example, a configuration of an optical scan device that performs a two-dimensional scan. Note, however, that an unnecessarily detailed description may be omitted. For example, a detailed description of a matter that is already well known and a repeated description of substantially the same configuration may be omitted. This is intended to facilitate understanding of persons skilled in the art by avoiding making the following description unnecessarily redundant. It should be noted that the inventors provide the accompanying drawings and the following description for persons skilled in the art to fully understand the present disclosure and do not intend to limit the subject matter recited in the claims. In the following description, identical or similar constituent elements are given the same reference numerals.

In the present disclosure, the term "light" means electromagnetic waves including ultraviolet radiation (ranging from approximately 10 nm to approximately 400 nm in wavelength) and infrared radiation (ranging from approximately 700 nm to approximately 1 mm in wavelength) as well as visible light (ranging approximately 400 nm to approximately 700 nm in wavelength). Ultraviolet radiation is herein sometimes referred to as "ultraviolet light", and infrared radiation is herein sometimes referred to as "infrared light".

In the present disclosure, an optical "scan" means changing the direction of light. A "one-dimensional scan" means changing the direction of light along a direction that intersects the direction. A "two-dimensional scan" means two-dimensionally changing the direction of light along a plane that intersects the direction.

FIG. 1 is a perspective view schematically showing a configuration of an optical scan device 100. The optical scan device 100 includes a waveguide array including a plurality of waveguide elements 10. Each of the plurality of waveguide elements 10 has a shape extending in a first direction (in FIG. 1, an X direction). The plurality of waveguide elements 10 are regularly arrayed in a second direction (in FIG. 1, a Y direction) that intersects the first direction. The plurality of waveguide elements 10, while propagating light in the first direction, emit the light in a third direction D3 that intersects an imaginary plane parallel to the first and second directions. Although the first direction (X direction) and the second direction (Y direction) are orthogonal to each other, they may not be orthogonal to each other. Although the plurality of waveguide elements 10 are placed at equal spacings in the Y direction, they do not necessarily need to be placed at equal spacings.

It should be noted that the orientation of a structure shown in a drawing of the present disclosure is set in view of understandability of explanation and is in no way intended to restrict any orientation whatsoever in an actual embodiment. Further, the shape and size of the whole or a part of a structure shown in a drawing are not intended to restrict an actual shape and size.

Each of the plurality of waveguide elements 10 has first and second mirrors 30 and 40 (each hereinafter sometimes referred to simply as "mirror") facing each other and an optical waveguide layer 20 located between the mirror 30 and the mirror 40. Each of the mirrors 30 and 40 has a reflecting surface, situated at the interface with the optical waveguide layer 20, that intersects the third direction D3. The mirror 30, the mirror 40, and the optical waveguide layer 20 have shapes extending in the first direction (X direction).

As will be mentioned later, a plurality of the first mirrors 30 of the plurality of waveguide elements 10 may be a plurality of portions of a mirror of integral construction. Further, a plurality of the second mirrors 40 of the plurality of waveguide elements 10 may be a plurality of portions of a mirror of integral construction. Furthermore, a plurality of the optical waveguide layers 20 of the plurality of waveguide elements 10 may be a plurality of portions of an optical waveguide layer of integral construction. A plurality of waveguides can be formed by at least (1) each first mirror 30 being constructed separately from another first mirror 30, (2) each second mirror 40 being constructed separately from another second mirror 40, or (3) each optical waveguide layer 20 being constructed separately from another optical waveguide layer 20. The phrase "being constructed separately" encompasses not only physically providing space but also separating first mirrors 30, second mirrors 40, or optical waveguide layers 20 from each other by placing a material of a different refractive index between them.

The reflecting surface of the first mirror 30 and the reflecting surface of the second mirror 40 face each other substantially in a parallel fashion. Of the two mirrors 30 and 40, at least the first mirror 30 has the property of transmitting a portion of light propagating through the optical waveguide layer 20. In other words, the first mirror 30 has a higher light transmittance against the light than the second mirror 40. For this reason, a portion of light propagating through the optical waveguide layer 20 is emitted outward from the first mirror 30. Such mirrors 30 and 40 may for example be multilayer mirrors that are formed by multilayer films of dielectrics (sometimes referred to as "multilayer reflective films").

An optical two-dimensional scan can be achieved by controlling the phases of lights that are inputted to the respective waveguide elements 10 and, furthermore, causing the refractive indices or thicknesses of the optical waveguide layers 20 of these waveguide elements 10 or the wavelengths of lights that are inputted to the optical waveguide layers 20 to simultaneously change in synchronization.

In order to achieve such a two-dimensional scan, the inventor conducted an analysis on the principle of operation of a waveguide element 10. As a result of their analysis, the inventor succeeded in achieving an optical two-dimensional scan by driving a plurality of waveguide elements 10 in synchronization.

As shown in FIG. 1, inputting light to each waveguide element 10 causes light to exit the waveguide element 10 through an exit surface of the waveguide element 10. The exit face is located on the side opposite to the reflecting surface of the first mirror 30. The direction D3 of the emitted light depends on the refractive index and thickness of the optical waveguide layer and the wavelength of light. At least one of the refractive index of each optical waveguide layer, the thickness of each optical waveguide layer, or the wavelength is controlled in synchronization so that lights that are emitted separately from each waveguide element 10 are oriented in substantially the same direction. This makes it possible to change X-direction components of the wave number vectors of lights that are emitted from the plurality of waveguide elements 10. In other words, this makes it possible to change the direction D3 of the emitted light along a direction 101 shown in FIG. 1.

Furthermore, since the lights that are emitted from the plurality of waveguide elements 10 are oriented in the same direction, the emitted lights interfere with one another. By controlling the phases of the lights that are emitted from the respective waveguide elements 10, a direction in which the lights reinforce one another by interference can be changed. For example, in a case where a plurality of waveguide elements 10 of the same size are placed at equal spacings in the Y direction, lights differing in phase by a constant amount from one another are inputted to the plurality of waveguide elements 10. By changing the phase differences, Y-direction components of the wave number vectors of the emitted lights can be changed. In other words, by varying phase differences among lights that are introduced into the plurality of waveguide elements 10, the direction D3, in which the emitted lights reinforce one another by interference, can be changed along a direction 102 shown in FIG. 1. This makes it possible to achieve an optical two-dimensional scan.

The following describes the principle of operation of the optical scan device 100.

Principle of Operation of Waveguide Element

Figure 2:
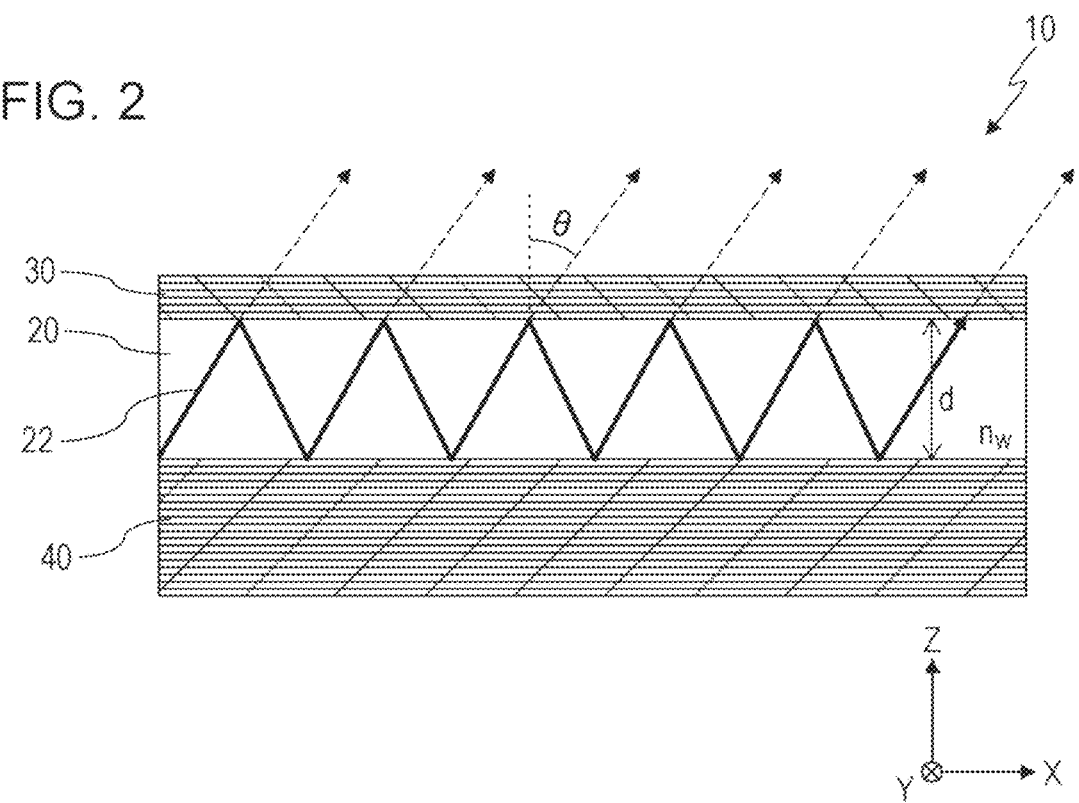
FIG. 2 is a diagram schematically showing an example of a cross-section structure of one waveguide element and an example of propagating light.

FIG. 2 is a diagram schematically showing an example of a cross-section structure of one waveguide element 10 and an example of propagating light. With a Z direction being a direction perpendicular of the X and Y directions shown in FIG. 1, FIG. 2 schematically shows a cross-section parallel to an X-Z plane of the waveguide element 10. The waveguide element 10 is configured such that the pair of mirrors 30 and 40 are disposed so as to hold the optical waveguide layer 20 therebetween. Light 22 introduced into the optical waveguide layer 20 through one end of the optical waveguide layer 20 in the X direction propagates through the inside of the optical waveguide layer 20 while being repeatedly reflected by the first mirror 30 provided on an upper surface (in FIG. 2, the upper side) of the optical waveguide layer 20 and the second mirror 40 provided on a lower surface (in FIG. 2, the lower side) of the optical waveguide layer 20. The light transmittance of the first mirror 30 is higher than the light transmittance of the second mirror 40. For this reason, a portion of the light can be outputted mainly from the first mirror 30.

In the case of a waveguide such as an ordinary optical fiber, light propagates along the waveguide while repeating total reflection. On the other hand, in the case of a waveguide element 10, light propagates while being repeatedly reflected by the mirrors 30 and 40 disposed above and below, respectively, the optical waveguide layer 20. For this reason, there are no restrictions on angles of propagation of light. The term "angle of propagation of light" here means an angle of incidence on the interface between the mirror 30 or 40 and the optical waveguide layer 20. Light falling on the mirror 30 or 40 at an angle that is closer to the perpendicular can be propagated, too. That is, light falling on the interface at an angle that is smaller than a critical angle of total reflection can be propagated, too. This causes the group speed of light in the direction of propagation of light to be much lower than the speed of light in free space. For this reason, the waveguide element 10 has such a property that conditions for propagation of light vary greatly according to changes in the wavelength of light, the thickness of the optical waveguide layer 20, and the refractive index of the optical waveguide layer 20. Such a waveguide element is referred to as "reflective waveguide" or "slow light waveguide".

The angle of emission θ of light that is emitted into the air from the waveguide element 10 is expressed by Formula (1) as follows:

$$\sin\theta = \sqrt{n_w^2 - \left(\frac{m\lambda}{2d}\right)^2} \quad (1)$$

As can be seen from Formula (1), the direction of emission of light can be changed by changing any of the wavelength λ of light in the air, the refractive index $n_w$ of the optical waveguide layer 20, and the thickness d of the optical waveguide layer 20.

For example, in a case where $n_w$=2, d=387 nm, λ=1550 nm, and m=1, the angle of emission is 0 degree. Changing the refractive index from this state to $n_w$=2.2 changes the angle of emission to approximately 66 degrees. Meanwhile, changing the thickness to d=420 nm without changing the refractive index changes the angle of emission to approximately 51 degrees. Changing the wavelength to λ=1500 nm without changing the refractive index or the thickness changes the angle of emission to approximately 30 degrees. In this way, the direction of emission of light can be greatly changed by changing any of the wavelength λ of light, the refractive index $n_w$ of the optical waveguide layer 20, and the thickness d of the optical waveguide layer 20.

Accordingly, the optical scan device 100 of the present disclosure controls the direction of emission of light by controlling at least one of the wavelength λ of light that is inputted to each of the optical waveguide layers 20, the refractive index $n_w$ of each of the optical waveguide layers 20, or the thickness d of each of the optical waveguide layers 20. The wavelength λ of light may be kept constant without being changed during operation. In that case, an optical scan can be achieved through a simpler configuration. The wavelength λ is not limited to a particular wavelength. For example, the wavelength λ may be included in a wavelength range of 400 nm to 1100 nm (from visible light to near-infrared light) within which high detection sensitivity is attained by a common photodetector or image sensor that detects light by absorbing light through silicon (Si). In another example, the wavelength λ may be included in a near-infrared wavelength range of 1260 nm to 1625 nm within which an optical fiber or a Si waveguide has a comparatively small transmission loss. It should be noted that these wavelength ranges are merely examples. A wavelength range of light that is used is not limited to a wavelength range of visible light or infrared light but may for example be a wavelength range of ultraviolet light.

In order to change the direction of emitted light, the optical scan device 100 may include a first adjusting element that changes at least one of the refractive index of the optical waveguide layer 20 of each waveguide element 10, the thickness of the optical waveguide layer 20 of each waveguide element 10, or the wavelength.

As stated above, using a waveguide element 10 makes it possible to greatly change the direction of emission of light by changing at least one of the refractive index $n_w$ of the optical waveguide layer 20, the thickness d of the optical waveguide layer 20, or the wavelength λ. This makes it possible to change, to a direction along the waveguide element 10, the angle of emission of light that is emitted from the mirror 30. By using at least one waveguide element 10, such a one-dimensional scan can be achieved.

In order to adjust the refractive index of at least a part of the optical waveguide layer 20, the optical waveguide layer 20 may contain a liquid crystal material or an electro-optical material. The optical waveguide layer 20 may be sandwiched between a pair of electrodes. By applying a voltage to the pair of electrodes, the refractive index of the optical waveguide layer 20 can be changed.

In order to adjust the thickness of the optical waveguide layer 20, at least one actuator may be connected, for example, to at least either the first mirror 30 or the second mirror 40. The thickness of the optical waveguide layer 20 can be changed by varying the distance between the first mirror 30 and the second mirror 40 through the at least one actuator. When the optical waveguide layer 20 is formed from liquid, the thickness of the optical waveguide layer 20 may easily change.

Principle of Operation of Two-Dimensional Scan

In a waveguide array in which a plurality of waveguide elements 10 are unidirectionally arrayed, the interference of lights that are emitted from the respective waveguide elements 10 brings about a change in direction of emission of light. By adjusting the phases of lights that are supplied separately to each waveguide element 10, the direction of emission of light can be changed. The following describes the principles on which it is based.

Figure 3A:
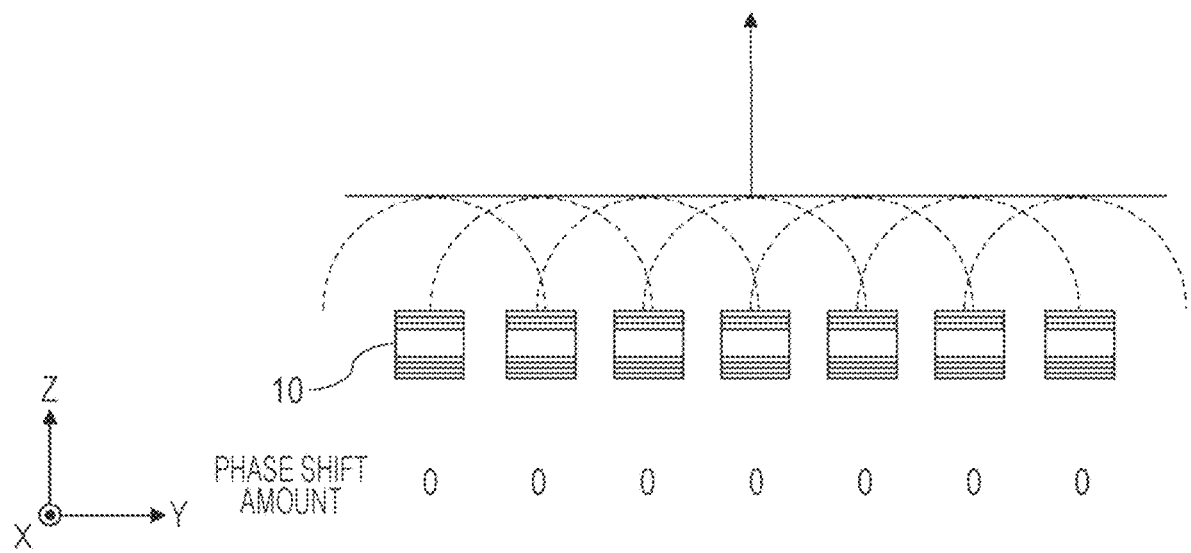
FIG. 3A is a diagram showing a cross-section of a waveguide array that emits light in a direction perpendicular to an exit face of the waveguide array.

FIG. 3A is a diagram showing a cross-section of a waveguide array that emits light in a direction perpendicular to an exit face of the waveguide array. FIG. 3A also describes the phase shift amounts of lights that propagate separately through each waveguide element 10. Note here that the phase shift amounts are values based on the phase of the light that propagates through the leftmost waveguide element 10. The waveguide array includes a plurality of waveguide elements 10 arrayed at equal spacings. In FIG. 3A, the dashed circular arcs indicate the wave fronts of lights that are emitted separately from each waveguide element 10. The straight line indicates a wave front that is formed by the interference of the lights. The arrow indicates the direction of light that is emitted from the waveguide array (i.e. the direction of a wave number vector). In the example shown in FIG. 3A, lights propagating through the optical waveguide layers 20 of each separate waveguide element 10 are identical in phase to one another. In this case, the light is emitted in a direction (Z direction) perpendicular to both an array direction (Y direction) of the waveguide elements 10 and a direction (X direction) in which the optical waveguide layers 20 extend.

Figure 3B:
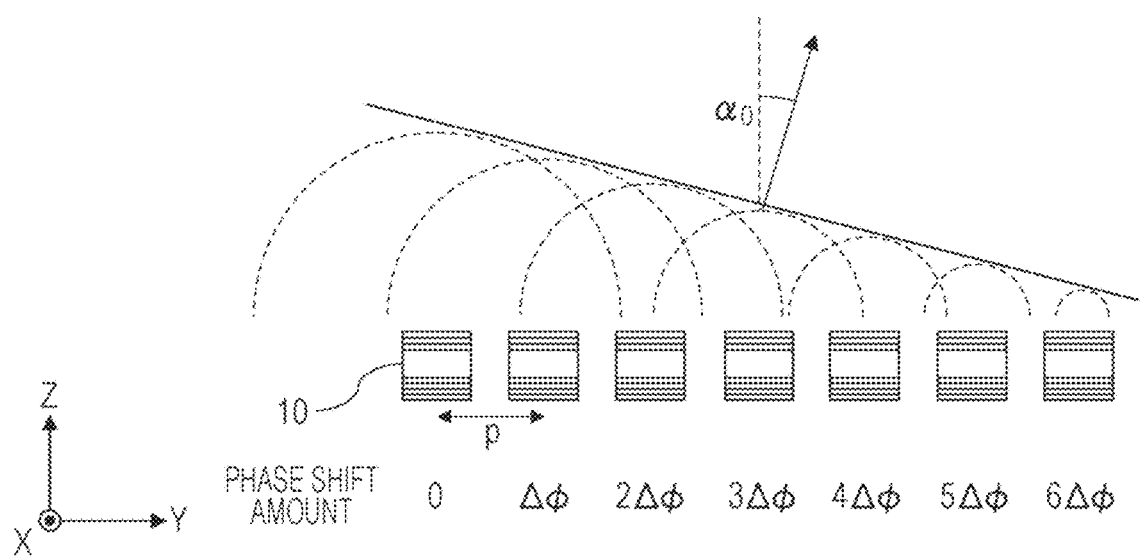
FIG. 3B is a diagram showing a cross-section of a waveguide array that emits light in a direction different from a direction perpendicular to an exit face of the waveguide array.

FIG. 3B is a diagram showing a cross-section of a waveguide array that emits light in a direction different from a direction perpendicular to an exit face of the waveguide array. In the example shown in FIG. 3B, lights propagating through the optical waveguide layers 20 of the plurality of waveguide elements 10 differ in phase from one another by a constant amount (Δφ) in the array direction. In this case, the light is emitted in a direction different from the Z direction. By varying Δφ, a Y-direction component of the wave number vector of the light can be changed. Assuming that p is the center-to-center distance between two adjacent waveguide elements 10, the angle of emission $\alpha_0$ of light is expressed by Formula (2) as follows:

$$\sin\alpha_0 = \frac{\Delta\phi\lambda}{2\pi p} \quad (2)$$

In the example shown in FIG. 2, the direction of emission of light is parallel to the X-Z plane. That is, $\alpha_0$=0° In each of the examples shown in FIGS. 3A and 3B, the direction of light that is emitted from the optical scan device 100 is parallel to a Y-Z plane. That is, θ=0°. However, in general, the direction of light that is emitted from the optical scan device 100 is not parallel to the X-Z plane or the Y-Z plane. That is, θ≠0° and $α_0$≠0°.

Figure 4:
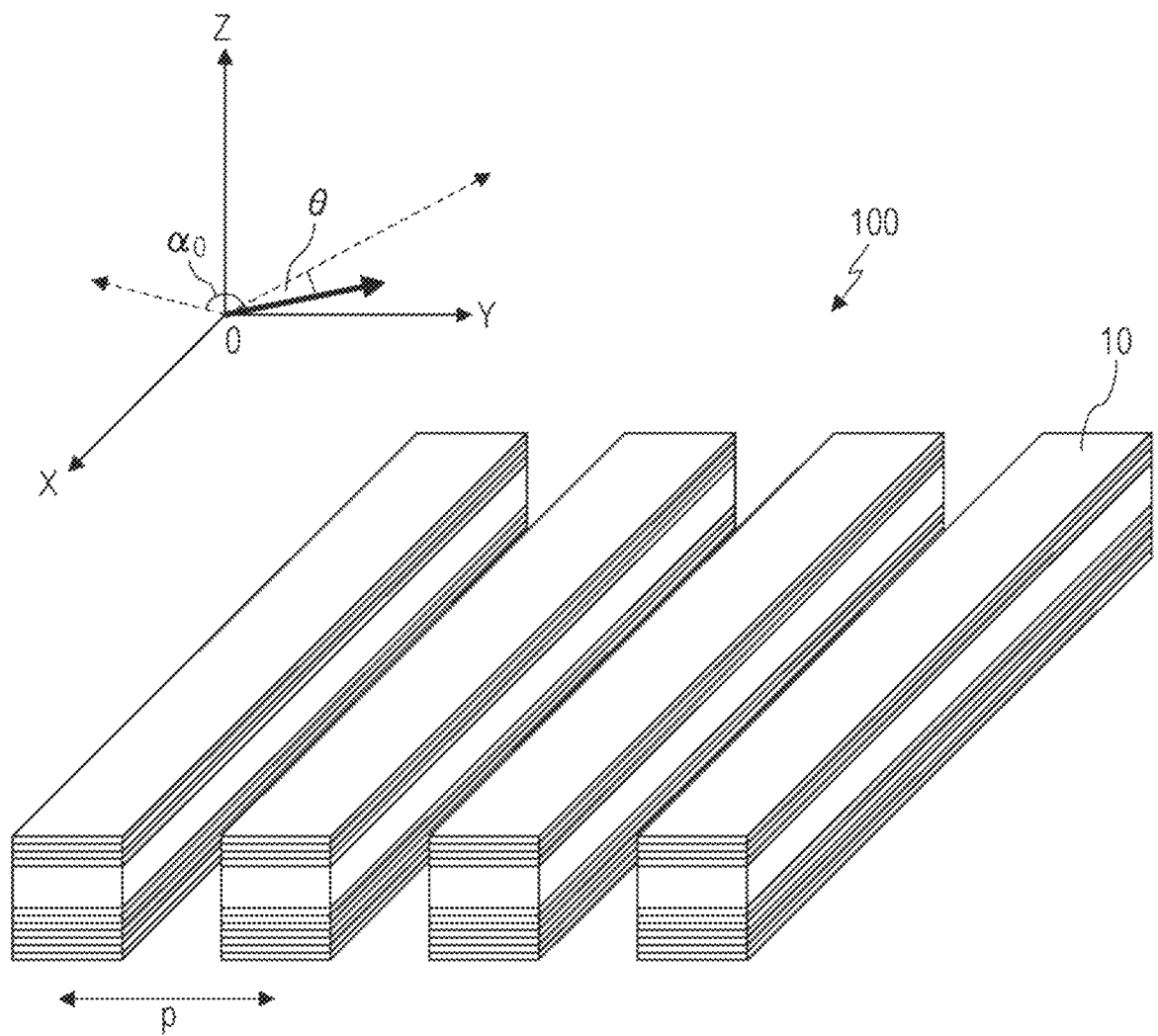
FIG. 4 is a perspective view schematically showing a waveguide array in a three-dimensional space.

FIG. 4 is a perspective view schematically showing a waveguide array in a three-dimensional space. The bold arrow shown in FIG. 4 represents the direction of light that is emitted from the optical scan device 100. θ is the angle formed by the direction of emission of light and the Y-Z plane. θ satisfies Formula (1). $α_0$ is the angle formed by the direction of emission of light and the X-Z plane. $α_0$ satisfies Formula (2).

Phase Control of Light that is Introduced into Waveguide Array

In order to control the phases of lights that are emitted from the respective waveguide elements 10, a phase shifter that changes the phase of light may be provided, for example, at a stage prior to the introduction of light into a waveguide element 10. The optical scan device 100 includes a plurality of phase shifters connected separately to each of the plurality of waveguide elements 10 and a second adjusting element that adjusts the phases of lights that propagate separately through each phase shifter. Each phase shifter includes a waveguide joined either directly or via another waveguide to the optical waveguide layer 20 of a corresponding one of the plurality of waveguide elements 10. The second adjusting element varies differences in phase among lights propagating from the plurality of phase shifters to the plurality of waveguide elements 10 and thereby changes the direction (i.e. the third direction D3) of light that is emitted from the plurality of I waveguide elements 10. As is the case with the waveguide array, a plurality of arrayed phase shifters are hereinafter sometimes referred to as "phase shifter array".

Figure 5:
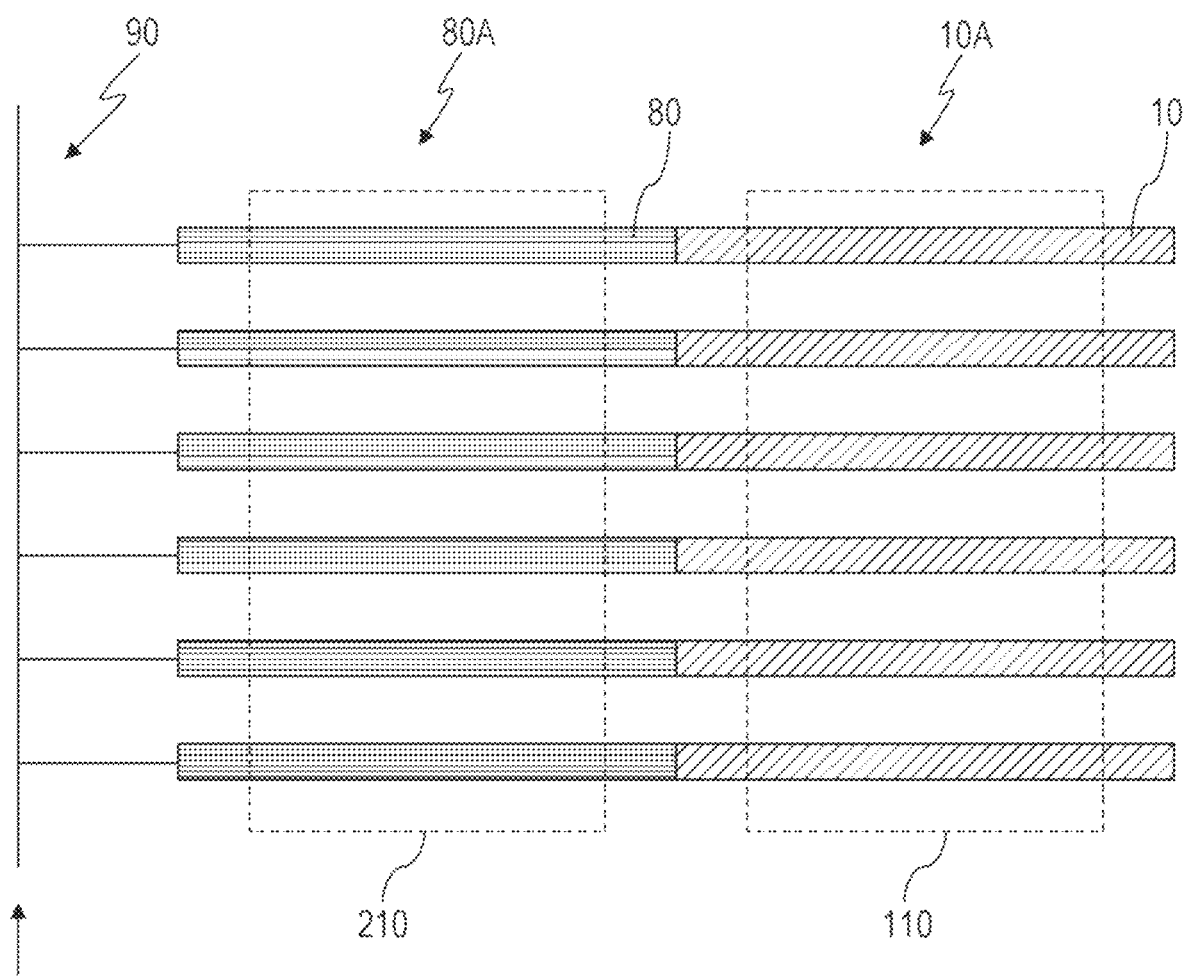
FIG. 5 is a schematic view of a waveguide array and a phase shifter array as seen from an angle parallel with a direction (Z direction) normal to a light exit face.

FIG. 5 is a schematic view of a waveguide array 10A and a phase shifter array 80A as seen from an angle parallel with a direction (Z direction) normal to a light exit face. In the example shown in FIG. 5, all phase shifters 80 have the same propagation characteristics, and all waveguide elements 10 have the same propagation characteristics. The phase shifter 80 and the waveguide elements 10 may be the same in length or may be different in length. In a case where the phase shifters 80 are equal in length, the respective phase shift amounts can be adjusted, for example, by a driving voltage. Further, by making a structure in which the lengths of the phase shifters 80 vary in equal steps, phase shifts can be given in equal steps by the same driving voltage. Furthermore, this optical scan device 100 further includes an optical divider 90 that divides light into lights and supplies the lights to the plurality of phase shifters 80, a first driving circuit 110 that drives each waveguide element 10, and a second driving circuit 210 that drives each phase shifter 80. The straight arrow shown in FIG. 5 indicates the inputting of light. A two-dimensional scan can be achieved by independently controlling the first driving circuit 110 and the second driving circuit 210, which are separately provided. In this example, the first driving circuit 110 functions as one element of the first adjusting element, and the second driving circuit 210 functions as one element of the second adjusting element.

The first driving circuit 110 changes at least either the refractive index or thickness of the optical waveguide layer 20 of each waveguide element 10 and thereby changes the angle of light that is emitted from the optical waveguide layer 20. The second driving circuit 210 changes the refractive index of the waveguide 20a of each phase shifter 80 and thereby changes the phase of light that propagates through the inside of the waveguide 20a. The optical divider 90 may be constituted by a waveguide through which light propagates by total reflection or may be constituted by a reflective waveguide that is similar to a waveguide element 10.

The lights divided by the optical divider 90 may be introduced into the phase shifters 80 after the phases of the lights have been controlled, respectively. This phase control may involve the use of, for example, a passive phase control structure based on an adjustment of the lengths of waveguides leading to the phase shifters 80. Alternatively, it is possible to use phase shifters that are similar in function to the phase shifters 80 and that can be controlled by electrical signals. The phases may be adjusted by such a method prior to introduction into the phase shifters 80, for example, so that lights of equal phases are supplied to all phase shifters 80. Such an adjustment makes it possible to simplify the control of each phase shifter 80 by the second driving circuit 210.

An optical device that is similar in configuration to the aforementioned optical scan device 100 can also be utilized as an optical receiver device. Details of the principle of operation of the optical device, a method of operation of the optical device, and the like are disclosed in U.S. Patent Application Publication No. 2018/0224709, the disclosure of which is hereby incorporated by reference herein in its entirety.

Fabrication of Optical Device by Bonding

An optical device 100 may be fabricated by bonding together an upper structure including a first mirror and a lower structure including a second mirror. The bonding may involve the use of a seal member such as ultraviolet-curable resin or thermosetting resin. For an optical scan through the application of a voltage, the optical waveguide layer 20 may include, for example, a liquid crystal material. Injection of the liquid crystal material into the optical device 100 may involve the utilization of, for example, vacuum encapsulation. Injecting the liquid crystal material into a space surrounded by the seal member makes it possible to prevent vacuum leaks during the injection of the liquid crystal material.

Figure 6:
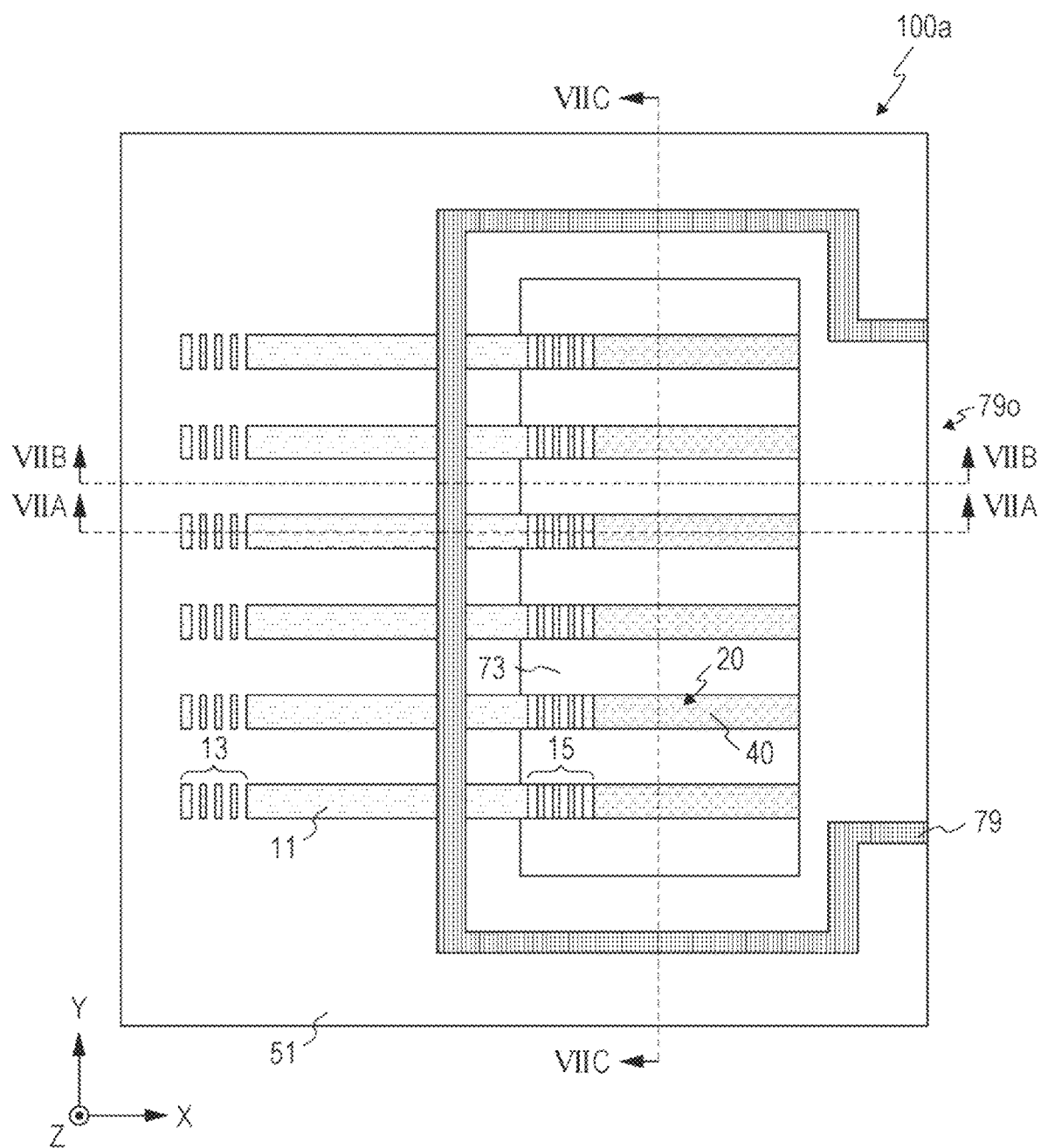
FIG. 6 is a diagram schematically showing an example of a lower structure of an optical device as seen from an angle parallel with the Z direction.
Figure 7A:
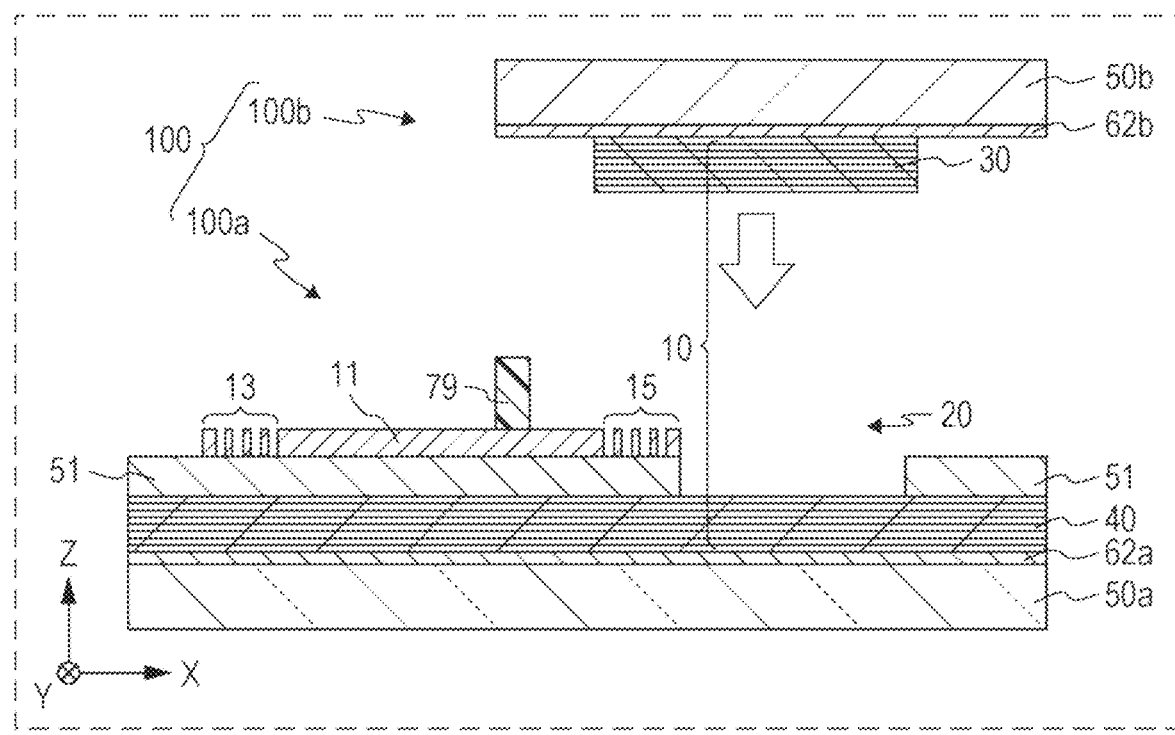
FIG. 7A is a diagram showing a cross-section taken along line VIIA-VIIA shown in FIG. 6.
Figure 7B:
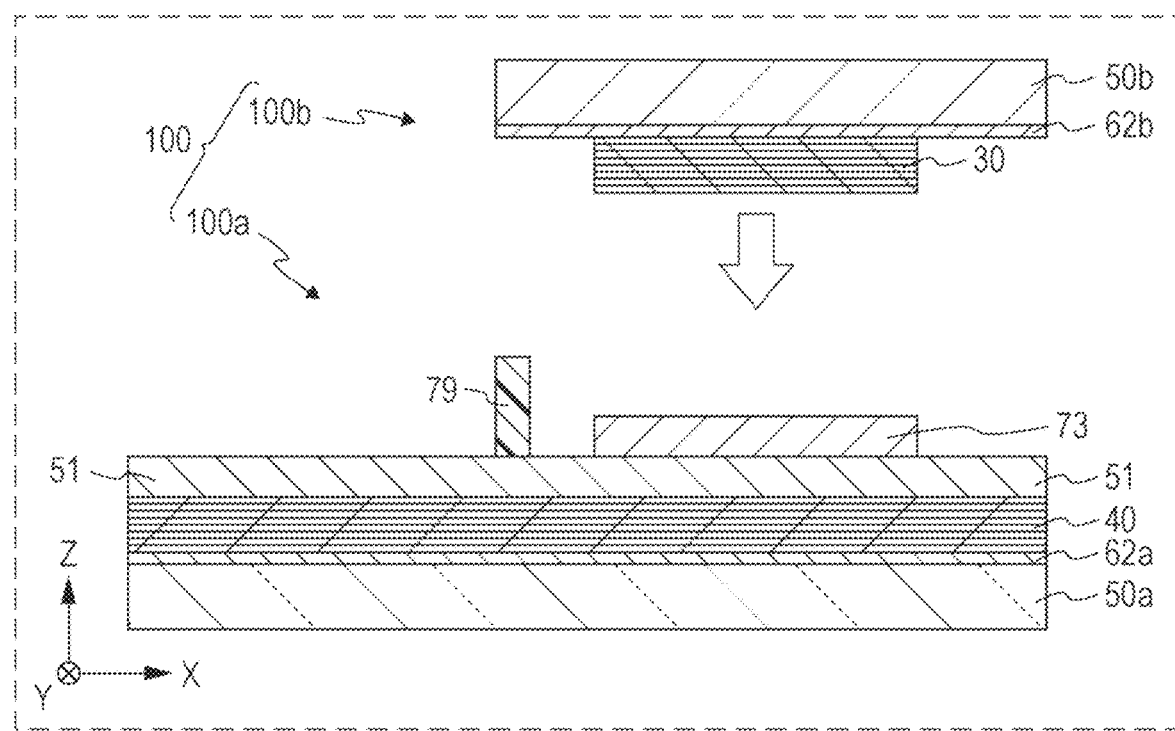
FIG. 7B is a diagram showing a cross-section taken along line VIIB-VIIB shown in FIG. 6.
Figure 7C:
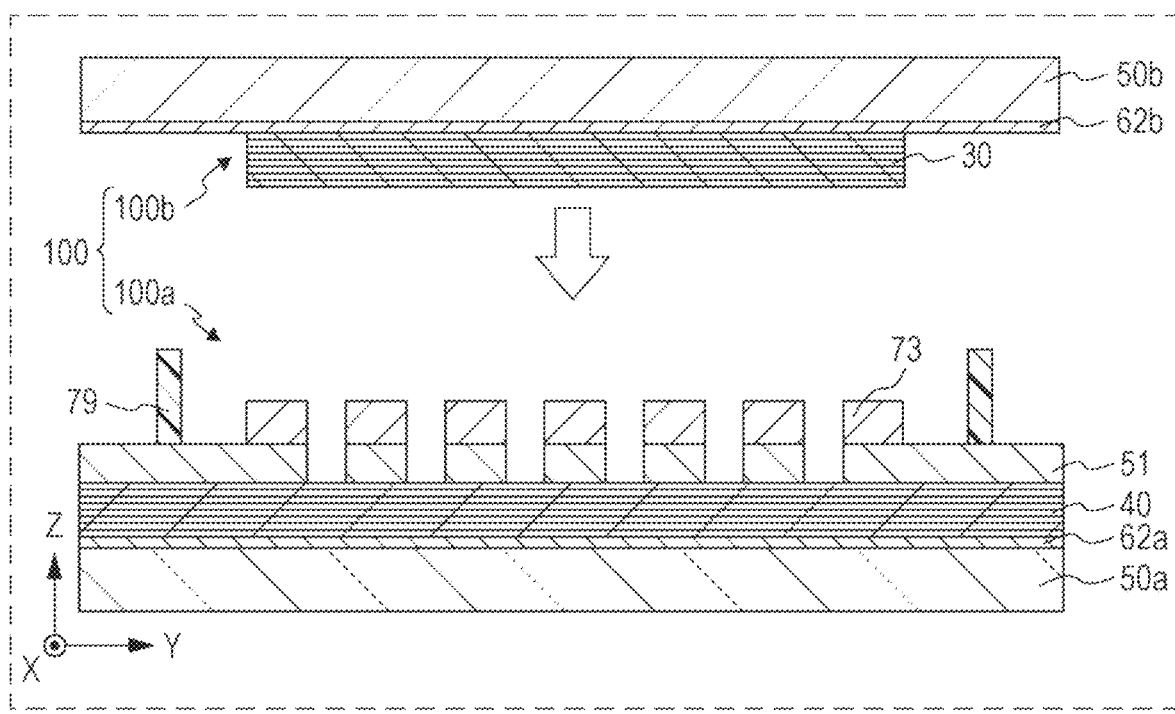
FIG. 7C is a diagram showing a cross-section taken along line VIIC-VIIC shown in FIG. 6.

FIG. 6 is a diagram schematically showing an example of a lower structure 100a of the optical device 100 as seen from an angle parallel with the Z direction. FIGS. 7A to 7C are diagrams showing cross-sections taken along lines VIIA-VIIA, VIIB-VIIB, and VIIC-VIIC shown in FIG. 6, respectively. FIGS. 7A to 7C schematically show examples of the lower structure 100a and an upper structure 100b of the optical device 100. The downward arrows shown in FIGS. 7A to 7C represent a direction of bonding.

After the lower structure 100a and the upper structure 100b have been bonded together, the liquid crystal material is injected through an inlet 790 shown in FIG. 6. After that, the inlet 790 is closed by a member that is identical to the seal member 79. The lower structure 100a includes a substrate 50a, an electrode 62a, a mirror 40, a dielectric layer 51, a plurality of optical waveguides 11, a plurality of partition walls 73, and the seal member 79. The upper structure 100b includes a substrate 50b, an electrode 62b, and a mirror 30. These constituent elements will be described in detail later.

Figure 8A:
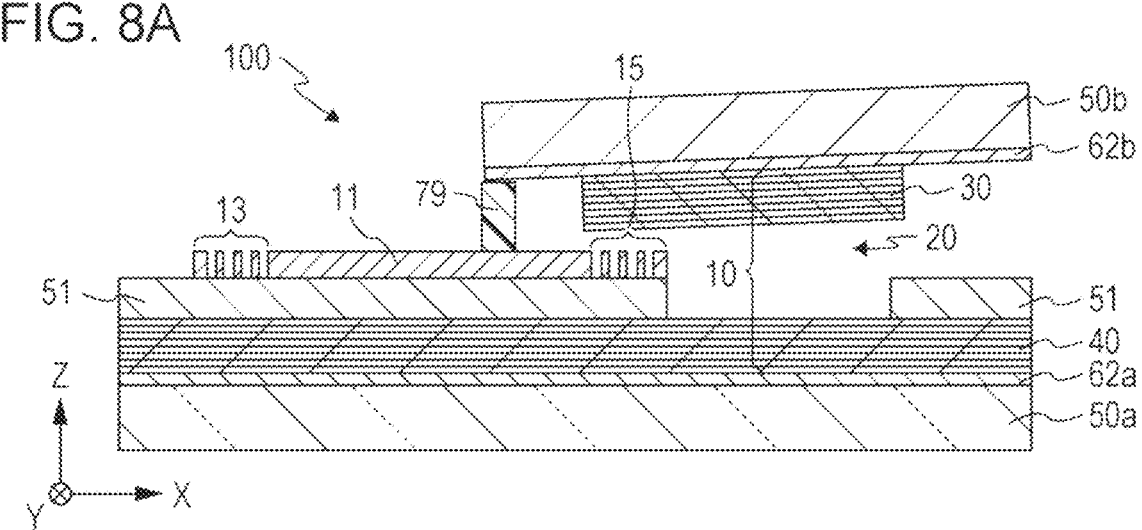
FIG. 8A is a diagram schematically showing an example of the optical device in which the lower and upper structures shown in FIG. 7A are bonded together.
Figure 8B:
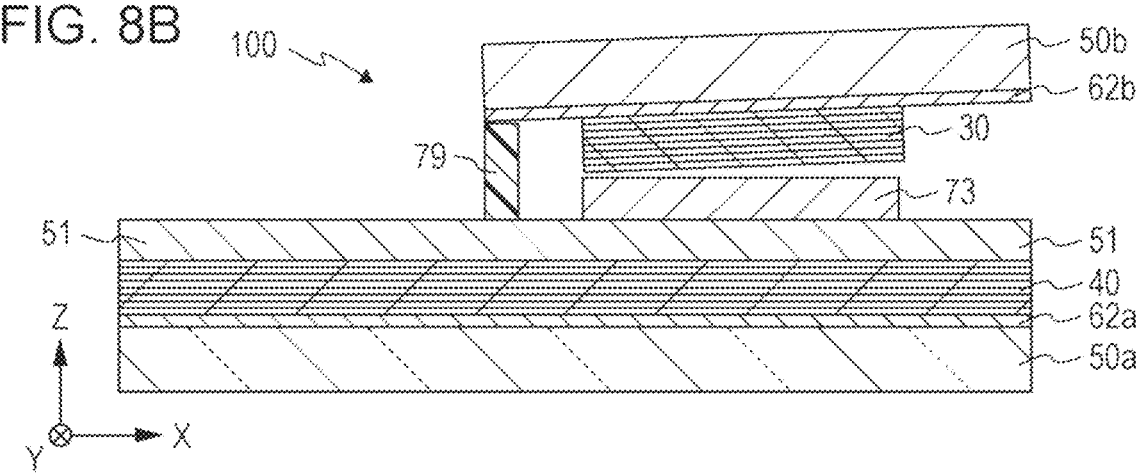
FIG. 8B is a diagram schematically showing an example of the optical device in which the lower and upper structures shown in FIG. 7B are bonded together.
Figure 8C:
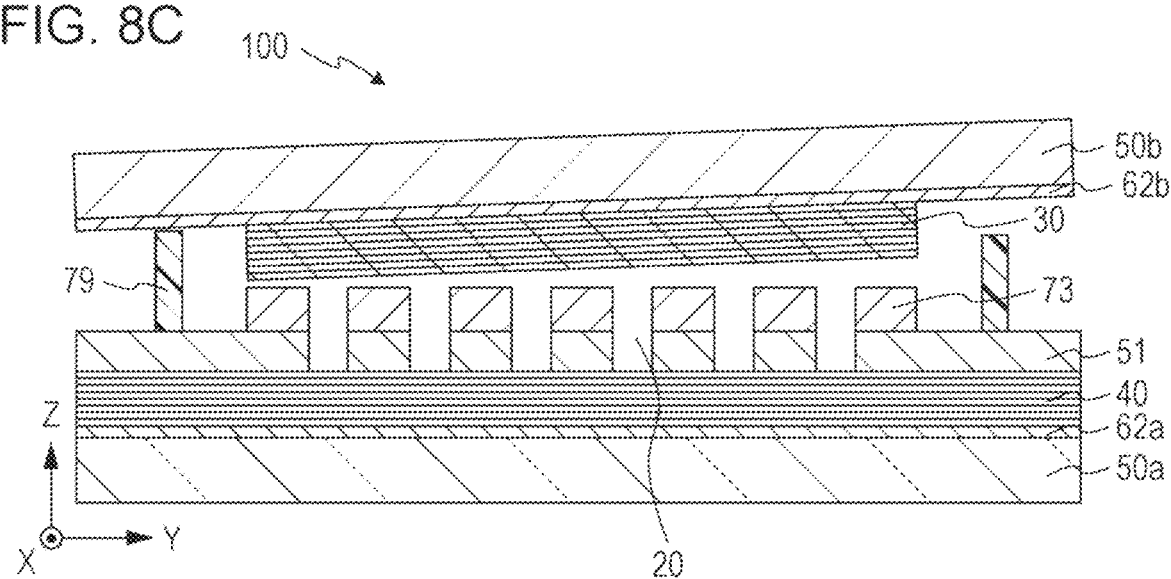
FIG. 8C is a diagram schematically showing an example of the optical device in which the lower and upper structures shown in FIG. 7C are bonded together.

FIGS. 8A to 8C are diagrams schematically showing an example of the optical device 100 in which the lower and upper structures 100a and 100b shown in FIGS. 7A to 7C are bonded together, respectively. As shown in FIGS. 8A to 8C, in actuality, the substrate 50a and the substrate 50b may not become parallel to each other even with an attempt to bond the lower structure 100a and the upper structure 100b together so that the lower structure 100a and the upper structure 100b are parallel to each other. This is attributed to the fact that a place of first contact between the lower structure 100a and the upper structure 100b serves as a fulcrum when the lower structure 100a and the upper structure 100b are bonded together. For example, a place of contact between the seal member 79 and the electrode 62b or a place of contact between one of the plurality of partition walls 73 and the mirror 30 may serve as a fulcrum. The application of unequal force to the upper structure 100b during bonding may cause the gap between the substrate 50a and the substrate 50b to vary between a place close to the fulcrum and a place distant from the fulcrum. For example, the gap between the substrate 50a and the substrate 50b may be larger in the place distant from the fulcrum than in the place close to the fulcrum. For this reason, the substrate 50a and the substrate 50b may not become parallel to each other. In that case, there is a possibility that the intensity of light that is emitted from the optical device 100 and the angle of emission of the light may deviate from design values.

Based on the foregoing studies, the inventor conceived of an optical device according to the following items.

An optical device according to a first item includes a first substrate having a first surface spreading along a first direction and a second direction intersecting the first direction, a second substrate having a second surface that at least partially faces the first surface, at least one optical waveguide extending along the first direction between the first substrate and the second substrate, and a plurality of spacers, disposed on at least either the first surface or the second surface, that include a first portion and a second portion. The second surface has a different area from an area of the first surface. The first portion of the plurality of elastic spacers is at least one elastic spacer located in a region between the first substrate and the second substrate in which the first substrate and the second substrate overlap each other as seen from an angle parallel with a direction perpendicular to the first surface. The second portion of the plurality of elastic spacers is at least one elastic spacer located in a region in which the first substrate and the second substrate do not overlap each other as seen from an angle parallel with the direction perpendicular to the first surface.

In this optical device, the first portion of the plurality of elastic spacers makes it possible to make the gap between the first substrate and the second substrate uniform. This results in making it possible to significantly improve the intensity of light that is emitted and the accuracy of the angle of emission. Furthermore, the second portion of the plurality of elastic spacers makes it possible to protect, from external contact, constituent elements provided in the region in which the first substrate and the second substrate do not overlap each other.

An optical device according to a second item is directed to the optical device according to the first item, further including a plurality of partition walls each of which extends along the first direction. The plurality of partition walls are arranged in the second direction between the first substrate and the second substrate. A modulus of elasticity of each of the plurality of elastic spacers is smaller than a modulus of elasticity of each of the plurality of partition walls.

In this optical device, the elastic spacers, which become compressed by acting like springs, makes the gap between the first substrate and the second substrate uniform as a whole.

An optical device according to a third item is directed to the optical device according to the second item, wherein the plurality of partition walls are directly or indirectly sandwiched between the first substrate and the second substrate. A ratio with which each of the plurality of elastic spacer deforms in the direction perpendicular to the first surface by being sandwiched between the first substrate and the second substrate is higher than a ratio with which each of the plurality of partition walls deforms in the perpendicular direction by being sandwiched between the first substrate and the second substrate.

In this optical device, since the deformation ratio of each spacer is higher than the deformation ratio of each partition wall, the gap between the first substrate and the second substrate is uniform as a whole.

An optical device according to a fourth item is directed to the optical device according to any of the first to third items, wherein each of the plurality of elastic spacers has a columnar shape.

This optical device can bring about the same effects as the optical devices according to the first to third items.

An optical device according to a fifth item is directed to the optical device according to any of the first to fourth items, wherein each of the at least one optical waveguide includes a first portion disposed in a region between the first substrate and the second substrate in which the first substrate and the second substrate overlap each other and a second portion disposed in a region in which the first substrate and the second substrate do not overlap each other.

This optical device allows light to be inputted from the second portion to the first portion.

An optical device according to a sixth item is directed to the optical device according to the fifth item, wherein the at least one optical waveguide includes a plurality of optical waveguides. At least a part of the second portion of the plurality of elastic spacers is located around the second portion of each of the plurality of optical waveguides.

In this optical device, at least the part of the second portion of the plurality of elastic spacers makes it possible to protect the second portion of the plurality of optical waveguides from external contact.

An optical device according to a seventh item is directed to the optical device according to the fifth or sixth item, wherein each of the at least one optical waveguide includes a portion located between two adjacent partition walls and includes a first grating in the portion.

This optical device allows light propagating through an optical waveguide to be coupled with high efficiency via the first grating.

An optical device according to an eighth item is directed to the optical device according to any of the fifth to seventh items, wherein each of the at least one optical waveguide includes a second grating in the second portion.

This optical device makes it possible to input light from outside to an optical waveguide via the second grating.

An optical device according to a ninth item is directed to the optical device according to any of the first to eighth items, further including a seal member that fixes a gap between the first substrate and the second substrate. The at least one optical waveguide has a structure in which one or more first optical waveguides and one or more second optical waveguides are connected to each other, respectively. The seal member surrounds the one or more first optical waveguides when seen from an angle parallel with the direction perpendicular to the first surface.

This optical device allows the one or more first optical waveguides to be hermetically closed by the first substrate, the second substrate, and the seal member.

An optical device according to a tenth item is directed to the optical device according to the ninth item, the one or more first optical waveguides each include one or more dielectric members extending along the first direction. A region surrounded by the seal member between the first substrate and the second substrate is filled with a member that is identical to the one or more dielectric members.

The one or more first optical waveguides of this optical device can be easily fabricated by filling, with the member that is identical to the one or more dielectric members, the space hermetically closed by the first substrate, the second substrate, and the seal member.

An optical device according to an eleventh item is directed to the optical device according to any of the first to tenth items, wherein the one or more first optical waveguides each include one or more dielectric members extending along the first direction. The optical device further includes two mirrors located between the first substrate and the one or more dielectric members and between the second substrate and the one or more dielectric members, respectively.

In this optical device, the two mirrors causes each first optical waveguide to function as a reflective waveguide. This allows light propagating through each first optical waveguide to be emitted outward.

An optical device according to a twelfth item is directed to the optical device according to the eleventh item, wherein at least a part of the first portion of the plurality of elastic spacers is located outside a region sandwiched between the two mirrors.

In this optical device, the gap between the first substrate and the second substrate after bonding can be made uniform even if particles intrude outside the region sandwiched between the two mirrors, as the gap between the first substrate and the second substrate in the direction perpendicular to the first surface in the region is large.

An optical device according to a thirteenth item is directed to the optical device according to any of the tenth to twelfth items, wherein the one or more first optical waveguides include a structure that is capable of adjusting refractive indices of the one or more dielectric members. A direction of light that is emitted via the first substrate or the second substrate from the one or more first optical waveguides or a direction of incidence of light that is taken into the one or more first optical waveguides via the first substrate or the second substrate is changed by adjusting the refractive indices of the one or more dielectric members.

This optical device can make an optical scan device that is capable of changing the direction of emission of light or an optical receiver device that is capable of changing the direction of reception of light.

An optical device according to a fourteenth item is directed to the optical device according to the thirteenth item, further including a pair of electrodes between which the one or more dielectric members are sandwiched. The one or more dielectric members contain a liquid crystal material or an electro-optical material. The refractive indices of the one or more dielectric members are adjusted by applying a voltage to the pair of electrodes.

This optical device can make the optical device according to the thirteenth item through the application of a voltage.

An optical device according to a fifteenth item is directed to the optical device according to the fourteenth item, further including one or more phase shifters connected either directly or via other waveguides to the one or more first optical waveguides, respectively. The direction of the light that is emitted via the first substrate or the second substrate from the one or more first optical waveguides or the direction of incidence of the light that is taken into the one or more first optical waveguides via the first substrate or the second substrate is changed by varying differences in phase among lights passing through the one or more phase shifters.

With the one or more phase shifters, this optical device can make an optical scan device that is capable of changing the direction of emission of light independently into two directions or an optical receiver device that is capable of changing the direction of reception of light independently into two directions.

A photodetection system according to a sixteenth item includes the optical device according to any of the first to fifteenth items, a photodetector that detects light emitted from the optical device and reflected from a physical object, and a signal processing circuit that generates distance distribution data based on an output from the photodetector.

This photodetection system can give the distance distribution data on the physical object by measuring the time it takes for the light reflected from the physical object to return.

A method according to a seventeenth item for manufacturing an optical device includes the steps of preparing a first substrate having a first surface and a second substrate having a second surface, forming, on the first surface of the first substrate, at least one optical waveguide extending along one direction, forming a plurality of elastic spacers on the first surface of the first substrate or on the second surface of the second substrate, fixing the first substrate and the second substrate after causing the first surface of the first substrate and the second surface of the second substrate to face each other so that the plurality of elastic spacers are located around the at least one optical waveguide, and exposing some of the plurality of elastic spacers by cutting away a part of the first substrate or the second substrate in which the plurality of elastic spacers are not provided.

This method for manufacturing an optical device makes it possible to manufacture the optical device according to the first item.

A method according to an eighteenth item for manufacturing an optical device is directed to the method according to the seventeenth item, further including the step of forming a plurality of partition walls. The step of forming the at least one optical waveguide includes the step of providing one or more dielectric members between the plurality of partition walls after the step of forming the plurality of partition walls.

This method for manufacturing an optical device makes it possible to form one or more optical waveguides each having one or more dielectric members between a plurality of partition walls.

A method according to a nineteenth item for manufacturing an optical device is directed to the method according to the seventeenth item, further including the step of forming a plurality of partition walls. The step of forming the at least one optical waveguide further includes the step of injecting one or more dielectric members containing a liquid crystal material into spaces between the plurality of partition walls after the step of fixing the first substrate and the second substrate.

This method for manufacturing an optical device makes it possible to form one or more optical waveguides each having, between a plurality of partition walls, one or more dielectric members containing a liquid crystal material.

The following describes an optical device according to an exemplary embodiment of the present disclosure.

Embodiment

Figure 9:
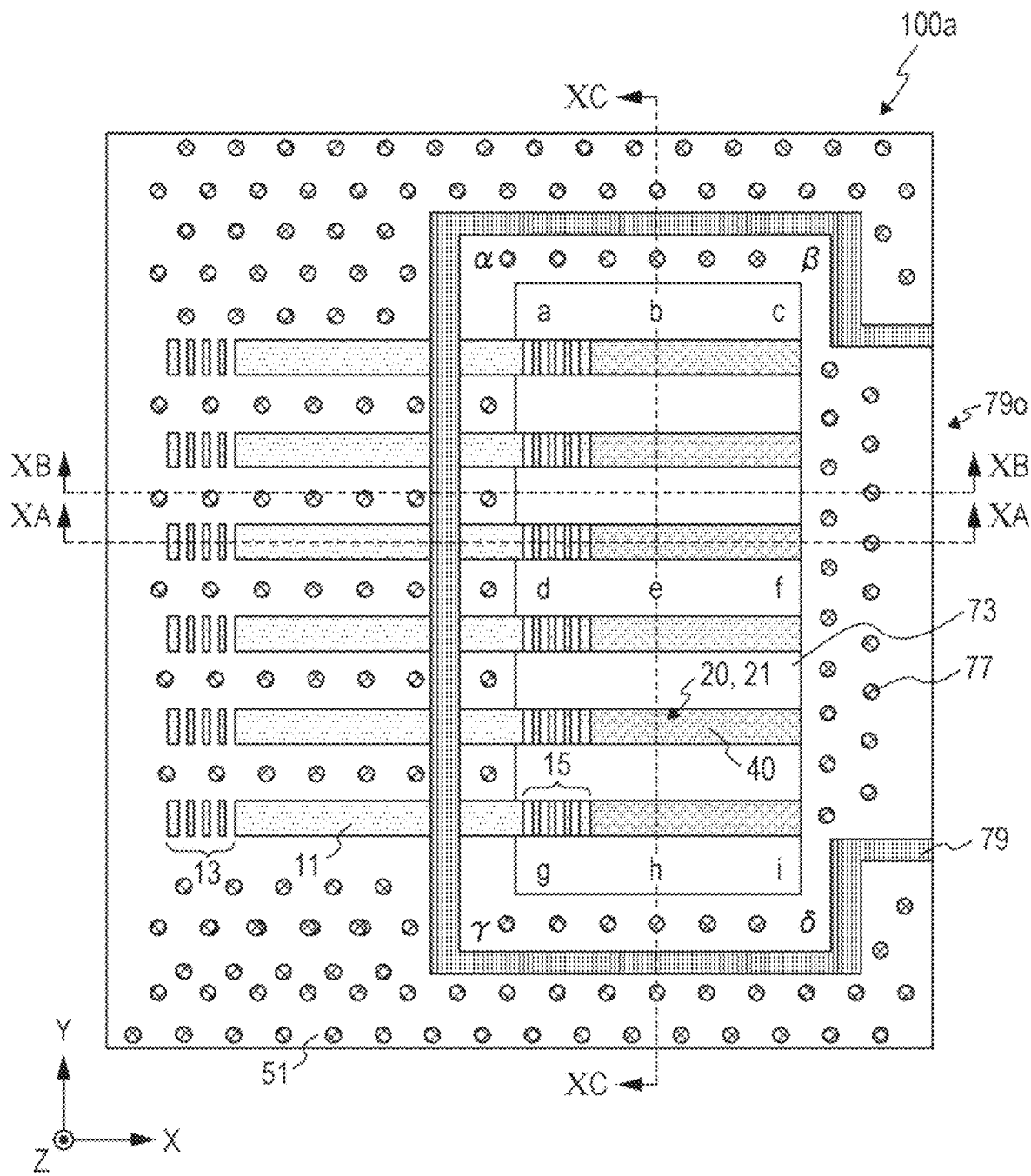
FIG. 9 is a diagram schematically showing an example of a lower structure of an optical device according to the present embodiment as seen from an angle parallel with the Z direction.
Figure 10A:
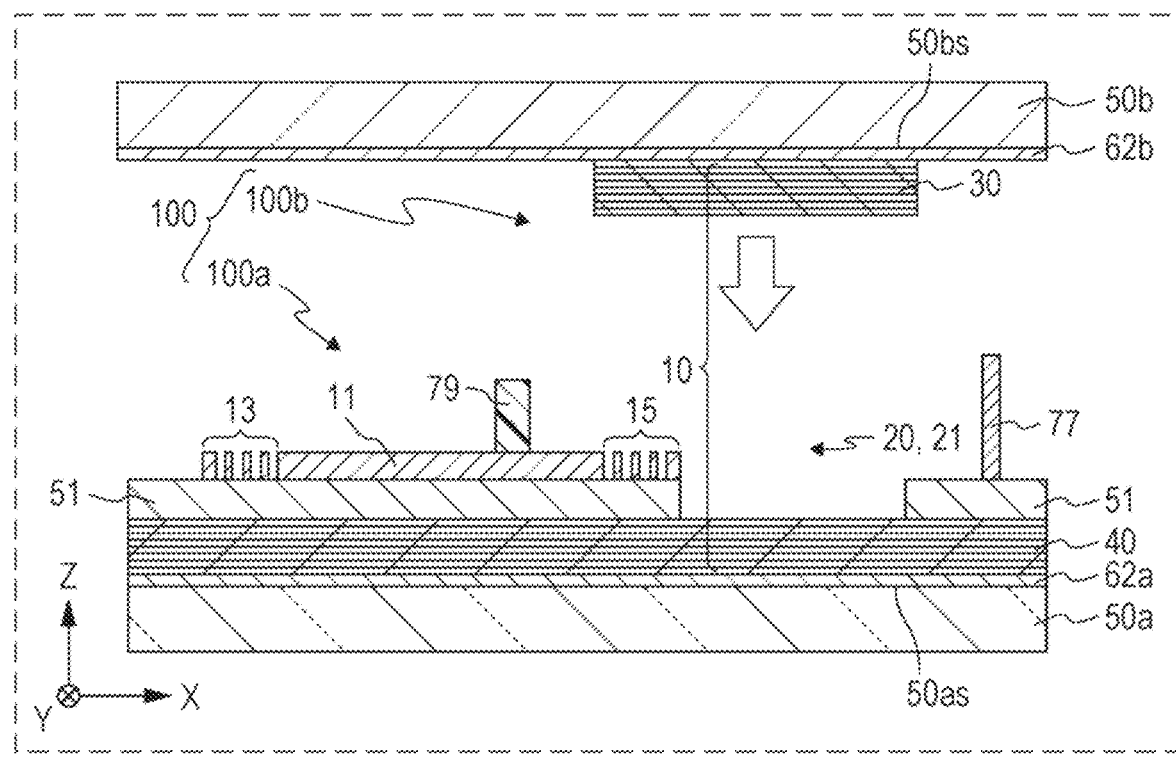
FIG. 10A is a diagram showing a cross-section taken along line XA-XA shown in FIG. 9.
Figure 10B:
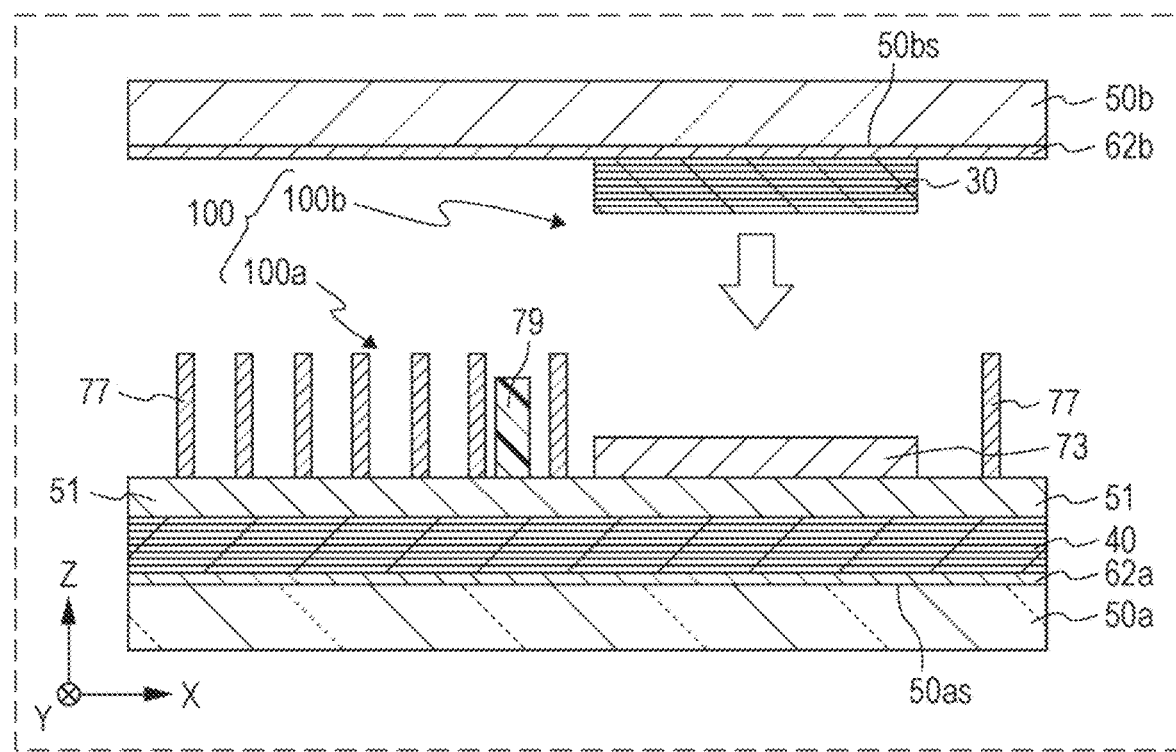
FIG. 10B is a diagram showing a cross-section taken along line XB-XB shown in FIG. 9.
Figure 10C:
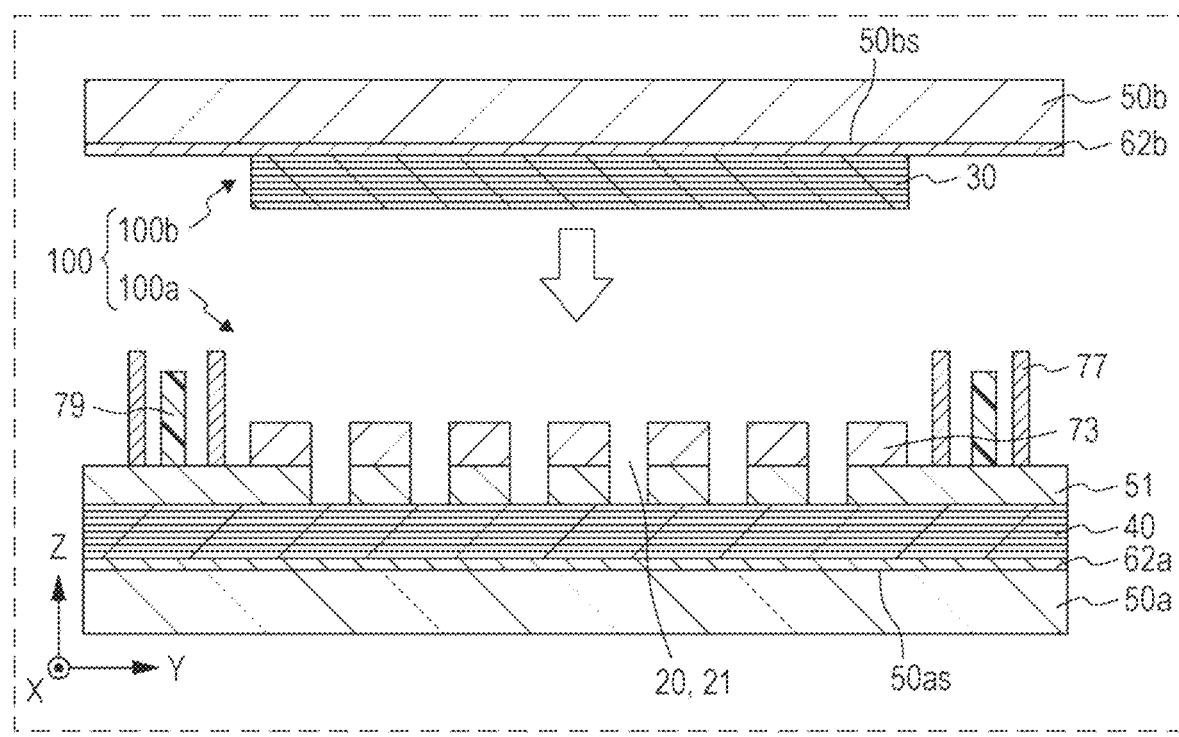
FIG. 10C is a diagram showing a cross-section taken along line XC-XC shown in FIG. 9.

FIG. 9 is a plan view schematically showing an example of a lower structure 100*a* of an optical device 100 according to the present embodiment. FIGS. 10A to 10C are diagrams showing cross-sections taken along lines XA-XA, XB-XB, and XC-XC shown in FIG. 9, respectively.

The optical device 100 includes a first substrate 50a, a second substrate 50b, a plurality of partition walls 73, a plurality of first optical waveguides 10, a plurality of elastic spacers 77, a seal member 79, and a plurality of second optical waveguides 11. The number of first optical waveguides 10 is not limited but may be 1. The same applies to the second optical waveguides 11 and the elastic spacers 77. In the following description, the "first substrate 50a" and the "second substrate 50b" are referred to as "substrate 50a" and "substrate 50b", respectively, and the "first optical waveguides 10" and the "second optical waveguides 11" are referred to as "optical waveguides 10" and "second optical waveguides 11", respectively.

The optical device 100 according to the present embodiment includes a lower structure 100a and an upper structure 100b.

The lower structure 100a includes the substrate 50a, an electrode 62a, a mirror 40, a dielectric layer 51, the plurality of partition walls 73, the plurality of elastic spacers 77, the seal member 79, and the optical waveguides 11. As shown in FIG. 10A, the substrate 50a has a first surface 50as that spreads along the X direction and the Y direction. The electrode 62a is provided on the substrate 50a. The mirror 40 is provided on the electrode 62a. The dielectric layer 51 is provided on the mirror 40. The partition walls 73, the elastic spacers 77, the seal member 79, and the optical waveguides 11 are provided on the dielectric layer 51.

The lower structure 100b includes the substrate 50b, which has a second surface 50bs, an electrode 62b, and the mirror 30. The second surface 50bs faces the first substrate 50as of the substrate 50a. The second surface 50bs has substantially the same area as the area of the first surface 50as. The electrode 62b is provided on the substrate 50b. The mirror 30 is provided on the electrode 62b.

One of the substrates 50a and 50b from which light is emitted has translucency. Both the substrate 50a and the substrate 50b may have translucency. Similarly, one of the electrodes 62a and 62b from which light is emitted has translucency. Both the electrode 62a and the electrode 62b may have translucency. At least either the electrode 62a or the electrode 62b may be formed, for example, from a transparent electrode. In the example shown in FIGS. 9 and 10A to 10C, light is emitted from the optical waveguides 10 through the electrode 62b and the substrate 50b of the upper structure 100b.

As shown in FIG. 9, the plurality of partition walls 73 are located between the substrate 50a and the substrate 50b, and are arranged in the Y direction. Each partition wall 73 extends along the X direction.

The plurality of optical waveguides 10 are defined by spaces between the plurality of partition walls 73. Each optical waveguide 10 includes a dielectric member 21 extending along the X direction. It should be noted that FIGS. 10A to 10C show a state in which a material constituting the dielectric member 21 is yet to be injected. The dielectric member 21 includes, for example, a liquid crystal material or an electro-optical material. The optical waveguide 10 includes the mirror 30, the mirror 40, and the dielectric member 21. The dielectric member 21 is provided in a region surrounded by the mirrors 30 and 40 and two adjacent partition walls 73. The optical waveguide 10 functions as the aforementioned slow light waveguide. The mirror 40 is located between the substrate 50a and the dielectric member 21. The mirror 30 is located between the substrate 50b and the dielectric member 21. The dielectric member 21 constitutes the optical waveguide layer 20 shown in FIG. 2. In the example shown in FIGS. 9 and 10A to 10C, a part of the dielectric layer 51 inside the optical waveguide layer 20 is removed, so that a part of the mirror 40 is exposed. The optical waveguide layer 20 is formed in a region sandwiched between the mirror 30 and the mirror 40.

The refractive index of the dielectric member 21 is higher than the refractive indices of the partition walls 73 and the dielectric layer 51. For this reason, light propagating through the inside of the optical waveguide layer 20 does not leak to the partial walls 73 or the dielectric layer 51 directly below the partition walls 73. Light propagating through the inside of the optical waveguide layer 20 is totally reflected off an interface between the optical waveguide layer 20 and each partition wall and an interface between the optical waveguide layer 20 and the dielectric layer 51.

The dielectric member 21 is directly or indirectly sandwiched between the two electrodes 62a and 62b. The phrase "directly sandwiched" means that the dielectric member 21 is sandwiched between the two electrodes 62a and 62b without another member interposed therebetween. The phrase "indirectly sandwiched" means that the dielectric member 21 is sandwiched between the two electrodes 62a and 62b with another member interposed therebetween. The refractive index of the dielectric member 21 is adjusted by applying a voltage to the two electrodes 62a and 62b. This results in a change in the angle of emission of light that is emitted outward from the optical waveguide 10.

It should be noted that the optical waveguide 10 does not need to be a slow light waveguide. The optical waveguide 10 may be a waveguide that causes light to propagate by total reflection. In the waveguide, light is emitted outward from an end of the optical waveguide 10 without passing through the substrate 50a or the substrate 50b.

The plurality of elastic spacers 77 are located around the plurality of optical waveguides 10. In the example shown in FIG. 9, the plurality of elastic spacers 77 are two-dimensionally arrayed. This array may be regular or periodic, or may be irregular. The diameter of each of the elastic spacers 77 in an X-Y plane may for example be larger than or equal to 10 μm and smaller than or equal to 100 μm. In the example shown in FIG. 9, the elastic spacers 77 are located both inside and outside a region surrounded by the seal member 79. The elastic spacers 77 may be provided only either inside or outside the region. In this way, the elastic spacers 77 are located at least inside or outside the region. Some of the elastic spacers 77 may be provided in the optical waveguide layer 20. The elastic spacers 77 may have one connected shape inside and/or outside the region surrounded by the seal member 79. The shape may be a linear shape, a curved shape, a wavy shape, or a zigzag shape when seen from an angle parallel with the Z direction.

In a state in which the lower structure 100a and the upper structure 100b are yet to be bonded together, the dimension of each of the elastic spacers 77 in the Z direction is larger than a total of the dimensions of each of the partition walls 73 and the mirror 30 in the Z direction. Further, in that state, the dimension of each of the elastic spacers 77 in the Z direction is larger than the dimension of the seal member 79 in the Z direction. Accordingly, when the lower structure 100a and the upper structure 100b are bonded together, the electrode 62b of the upper structure 100b makes first contact with the elastic spacers 77 of the lower structure 100a. For this reason, the place of contact between the seal member 79 and the electrode 62b or the place of contact between a partition wall 73 and the mirror 30 does not serve as a fulcrum.

The elastic spacers 77 elastically deform. In a case where an elastic body warps in the presence of the application of a force, the modulus of elasticity is defined by dividing the force applied by the warpage having occurred. The modulus of elasticity of the elastic spacers 77 is smaller than the moduli of elasticity of the partition walls 73 and the mirror 30. That is, the elastic spacers 77 more easily deform than the partition walls 73 and the mirror 30. When the lower structure 100a and the upper structure 100b are bonded together, the elastic spacers 77 become compressed by acting like springs. This brings upper surfaces of the partition walls 73 and the reflecting surface of the mirror 30 into uniform contact, so that the gap between the substrate 50a and the substrate 50b becomes uniform as a whole. As a result, the substrate 50a and the substrate 50b become substantially parallel to each other. At this point in time, the ratio with which each elastic spacer deforms in the Z direction by being sandwiched between the substrate 50a and the substrate 50b is higher than the ratio with which each partition wall deforms in the Z direction by being sandwiched between the substrate 50a and the substrate 50b.

The seal member 79 fixes the gap between the substrate 50a and the substrate 50b. As shown in FIG. 9, the seal member 79 surrounds the plurality of optical waveguides 10 and the plurality of partition walls 73 when seen from an angle parallel with the Z direction. The seal member 79 is provided across the optical waveguides 11 in the Y direction. An upper surface of the seal member 79 is parallel to the X-Y plane. The dimension of the seal member 79 in the Z direction on the dielectric layer 51 is equal to or larger than a total of the dimension of each of the partition walls 73 and the dimension of the mirror 30 in the Z direction. The seal member 79 may be formed from ultraviolet-curable resin or thermosetting resin. The material of the seal member 79 does not need to be ultraviolet-curable resin or thermosetting resin, provided the member can maintain the gap between the substrate 50a and the substrate 50b for a long period of time.

The optical waveguides 11 are connected to the optical waveguides 10. Light is supplied from the optical waveguides 11 to the optical waveguides 10. In the example shown in FIGS. 9 and 10A to 10C, the optical waveguides 11 are located on the dielectric layer 51. The dielectric layer 51 is located between the substrate 50a and the optical waveguides 11. By adjusting the dimension of the dielectric layer 51 in the Z direction, light propagating through the optical waveguides 11 can be coupled to the optical waveguides 10 with high efficiency. The dimension of the dielectric layer 51 in the Z direction may be adjusted, for example, so that the optical waveguides 11 are located near the center of the optical waveguide layer 20 in the Z direction. The optical waveguides 11 are waveguides that cause light to propagate by total reflection. Therefore, the refractive indices of the optical waveguides 11 are higher than the refractive index of the dielectric layer 51. It should be noted that the optical waveguides 11 may be slow light waveguides.

Each of the plurality of optical waveguides 11 includes a portion located between two adjacent ones of the plurality of partition walls 73. As shown in FIGS. 9 to 10C, each of the plurality of optical waveguides 11 may include a grating 15 in the portion. A propagation constant of an optical waveguide 11 is different from a propagation constant of an optical waveguide 10. The grating 15 causes the propagation constant of the optical waveguide 11 to shift by a reciprocal lattice. When the propagation constant of the optical waveguide 11 that has shifted by a reciprocal lattice matches the propagation constant of the optical waveguide 10, light propagating through the optical waveguide 11 is coupled to the optical waveguide 10 with high efficiency.

Figure 11A:
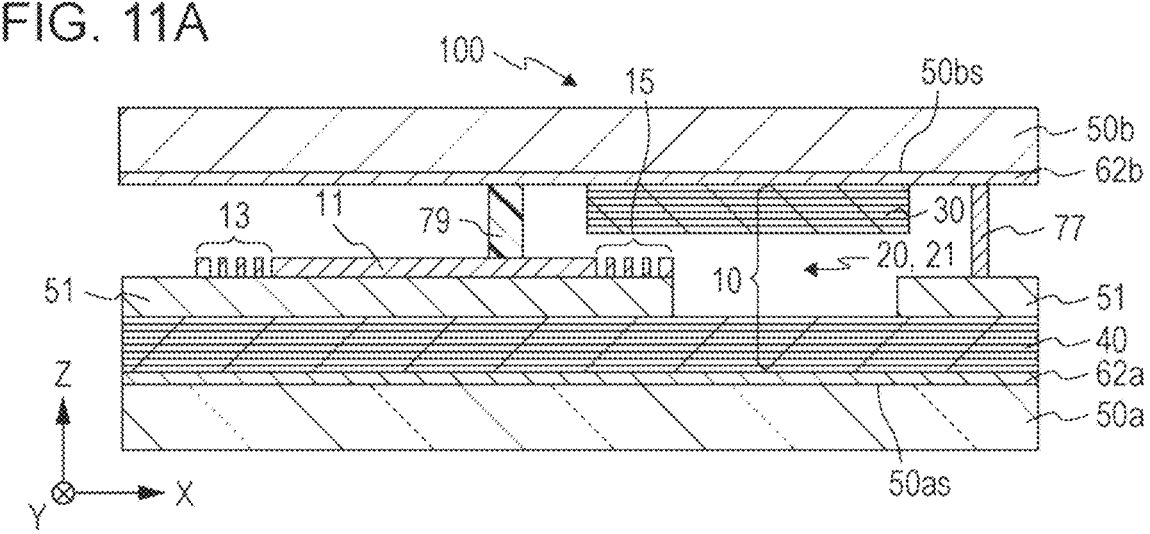
FIG. 11A is a diagram schematically showing an example of the optical device in which the lower and upper structures shown in FIG. 10A are bonded together.
Figure 11B:
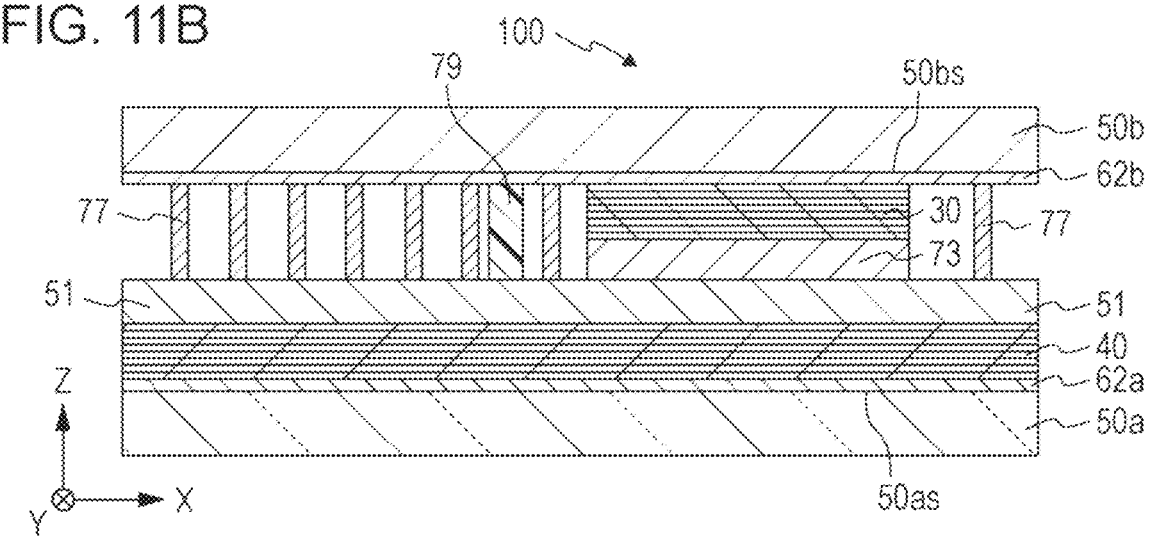
FIG. 11B is a diagram schematically showing an example of the optical device in which the lower and upper structures shown in FIG. 10B are bonded together.
Figure 11C:
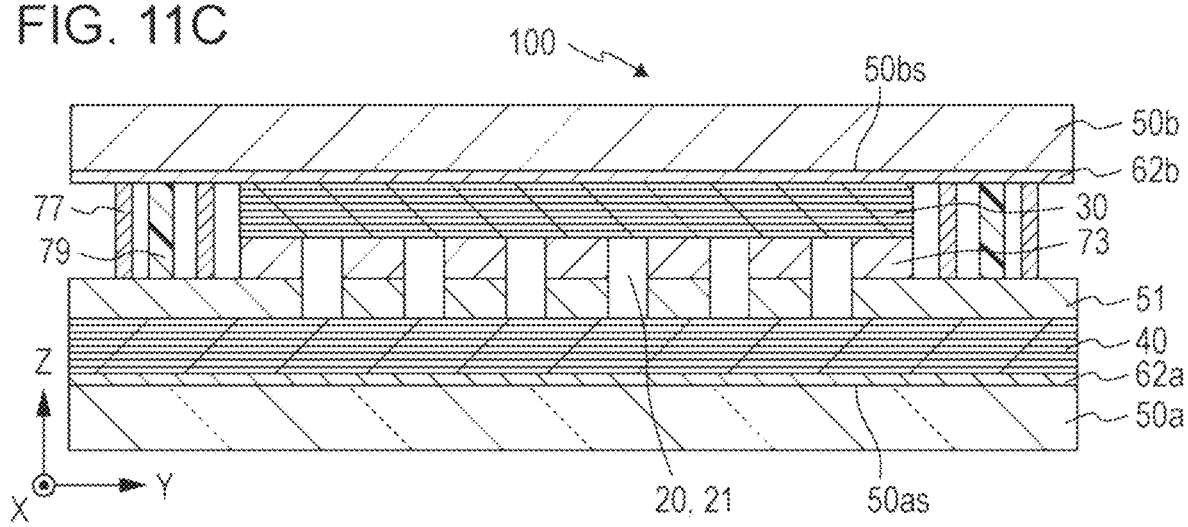
FIG. 11C is a diagram schematically showing an example of the optical device in which the lower and upper structures shown in FIG. 10C are bonded together.

FIGS. 11A to 11C are diagrams schematically showing an example of the optical device 100 in which the lower and upper structures 100a and 100b shown in FIGS. 10A to 10C are bonded together, respectively. As shown in FIGS. 11A to 11C, bonding the substrate 50a and the substrate 50b together causes a force to be uniformly applied to the first surface 50as and the second surface 50bs, which face each other, via the elastic spacers 77. This causes the substrate 50a and the substrate 50b to be substantially parallel to each other. The elastic spacers 77 are directly or indirectly sandwiched between the substrate 50a and the substrate 50b. In the example shown in FIGS. 11A to 11C, the elastic spacers 77 are directly sandwiched between the dielectric layer 51 of the lower structure 100a and the electrode 62b of the upper structure 100b. The dimension of each of the elastic spacers 77 in the Z direction is larger than the dimension of each of the partition walls 73 in the Z direction.

Figure 12A:
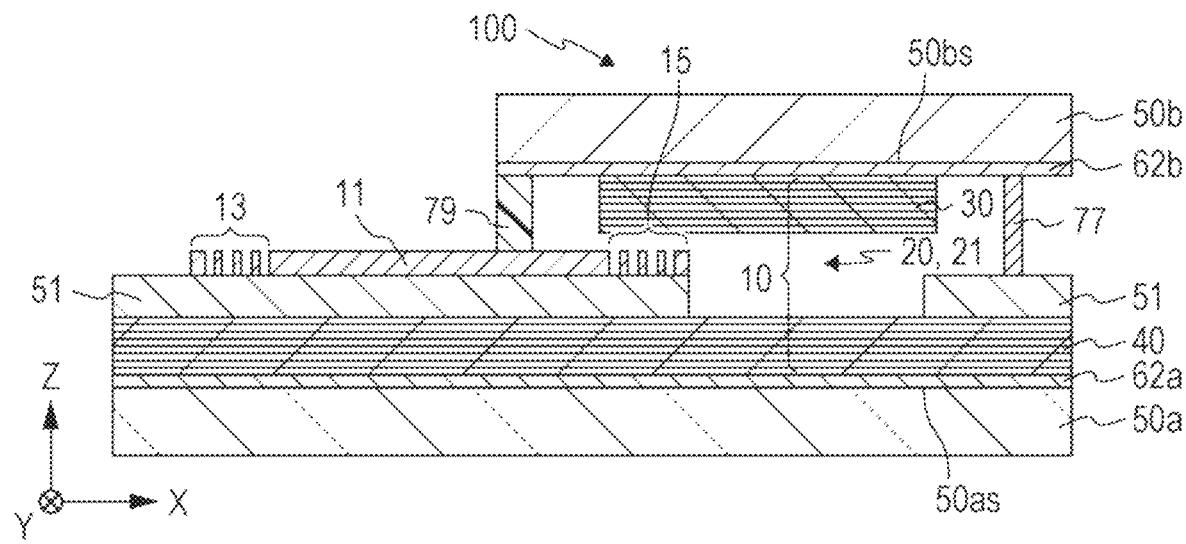
FIG. 12A is a diagram schematically showing an example of the optical device from which unnecessary portions have been cut off after the lower and upper structures shown in FIG. 11A have been bonded together.
Figure 12B:
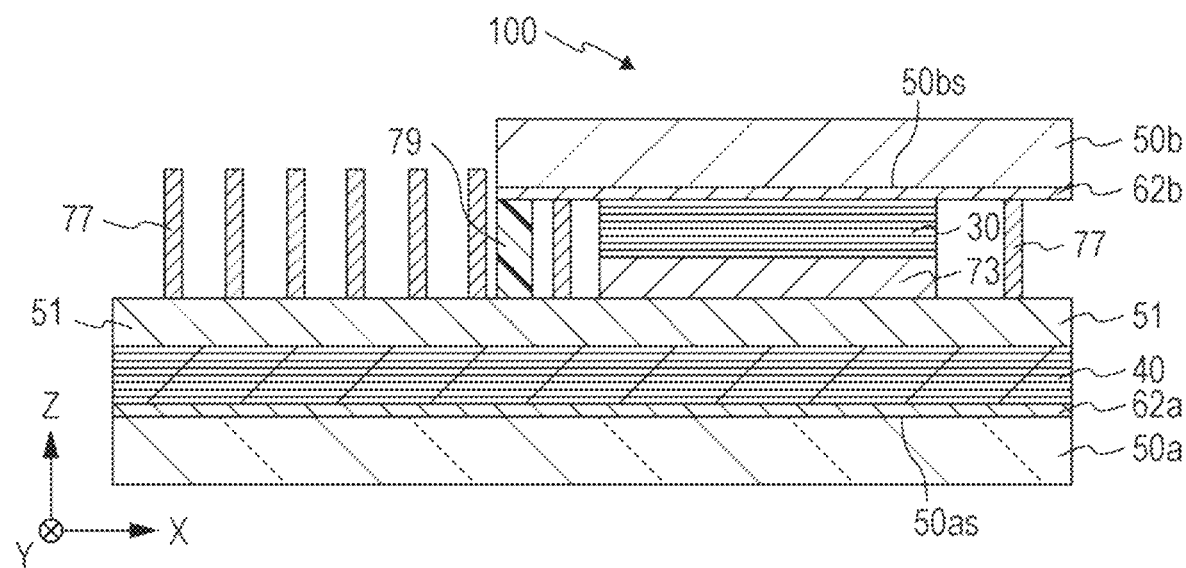
FIG. 12B is a diagram schematically showing an example of the optical device from which unnecessary portions have been cut off after the lower and upper structures shown in FIG. 11B have been bonded together.

FIGS. 12A and 12B are diagrams schematically showing an example from which parts of the substrates 50b and the electrodes 62b shown in FIGS. 11A and 11B have been cut off, respectively. Cutting removes parts of the periphery of the region surrounded by the seal member 79. As a result, the second surface 50bs has a different area from the area of the first surface 50as. As shown in FIGS. 12A and 12B, each of the optical waveguides 11 includes a portion that, when seen from an angle parallel with the Z direction, overlaps the substrate 50a but does not overlap the substrate 50b. The optical waveguide 11 may include a grating 13 in the non-overlapping portion. For the same reason as that stated above, light inputted through the grating 13 can be coupled to the optical waveguide 11 with higher efficiency. The optical waveguide 11 may include a portion that overlaps the substrate 50b but does not overlap the substrate 50a, or may include a portion that overlaps neither the substrate 50a nor the substrate 50b. In this way, the optical waveguide 11 may include a portion that, when seen from an angle parallel with a direction perpendicular to the surface of each substrate, does not overlap at least either the substrate 50a or the substrate 50b. In that case, some of the elastic spacers 77 remain on the dielectric layer 51 without being sandwiched between the substrate 50a and the substrate 50b. The dimensions of these elastic spacers 77 are larger than the other elastic spacers 77 in the Z direction. Since these elastic spacers 77 remain, the electrode 62a or 62b, the grating 13, and the optical waveguide 11 can be protected from external contact.

The following summarizes the roles of the elastic spacers 77. During manufacture of the optical device 100, the elastic spacers 77 serve to make the substrate 50a and the substrate 50b parallel to each other. During use of the optical device 100, the elastic spacers 77 serve to protect some constituent elements from external contact.

In a case where the dielectric member 21 is constituted by a liquid crystal material, the liquid crystal material is injected through the inlet 790 after the lower structure 100a and the upper structure 100b have been bonded together. The liquid crystal material may be injected through the inlet 790 after a part of at least either of the structures thus bonded together has been cut off. After the injection of the liquid crystal material, the inlet 790 is closed by a member that is identical to the seal member 79. The region thus hermetically closed is wholly filled with the liquid crystal material.

The region is a region located between the substrate 50a and the substrate 50b and surrounded by the seal member 79. The region is filled with a member that is identical to the dielectric member 21.

The following describes detailed examples of the materials and dimensions of constituent elements used in the fabrication of the optical device 100. The dimension in the Z direction is hereinafter sometimes referred to as "thickness".

First, examples of the materials and dimensions of the constituent elements of the lower structure 100a are described.

The substrate 50a may be formed, for example, from a $SiO_2$ layer. The dimensions of the substrate 50a in the X direction and the Y direction may for example both be 15 mm. The thickness of the substrate 50a may for example be 0.7 mm.

The electrode 62a may be formed, for example, from an ITO sputtered layer. The thickness of the electrode 62a may for example be 50 nm.

The mirror 40 may be a multilayer reflective film. The multilayer reflective film may be formed, for example, by alternately depositing and stacking a $Nb_2O_5$ layer and a $SiO_2$ layer. The $Nb_2O_5$ layer has a refractive index n of 2.282. The thickness of the $Nb_2O_5$ layer may for example be approximately 100 nm. The $SiO_2$ layer has a refractive index n of 1.468. The thickness of the $SiO_2$ layer may for example be approximately 200 nm. The mirror 40 has, for example, a total of sixty-one layers, namely thirty-one $Nb_2O_5$ layers and thirty $SiO_2$ layers. The thickness of the mirror 40 may for example be 9.1 μm.

The dielectric layer 51 may be formed, for example, from a $SiO_2$ deposited layer. The $SiO_2$ deposited layer has a refractive index n of 1.468. The thickness of the $SiO_2$ deposited layer may for example be approximately 1.0 μm.

Each of the optical waveguides 11 may be formed, for example, from a $Nb_2O_5$ deposited layer. The $Nb_2O_5$ deposited layer has a refractive index n of 2.282. The thickness of the $Nb_2O_5$ deposited layer may for example be approximately 300 nm. The optical waveguide 11 may have formed therein a grating 15 and a grating 13. The grating 15 has, for example, a duty ratio of 1:1 and a pitch of 640 nm. The grating 13 has, for example, a duty ratio of 1:1 and a pitch of 680 nm. The grating 15 and the grating 13 may be formed by patterning based on a photolithographic method. The dimension of the optical waveguide 11 in the Y direction may for example be 10 μm.

Each of the partition walls 73 may be formed, for example, from a $SiO_2$ deposited layer. The $SiO_2$ deposited layer has a refractive index n of 1.468. The thickness of the $SiO_2$ deposited layer may for example be approximately 1.0 μm. The dimension of the partition wall 73 in the Y direction may for example be 50 μm.

In the optical waveguide layer 20, a part of the dielectric layer 51 may be removed, for example, by patterning based on a photolithographic method. The thickness of the optical waveguide layer 20 may for example be 2.0 μm. The dimension of the optical waveguide layer 20 in the Y direction may for example be 10 μm.

Next, examples of the materials and dimensions of the constituent elements of the upper structure 100b are described.

The substrate 50b may be formed, for example, from a $SiO_2$ layer. The dimensions of the substrate 50b in the X direction and the Y direction may for example be 8 mm and 20 mm, respectively, and the thickness of the substrate 50a may for example be 0.7 mm.

The electrode 62b may be formed, for example, from an ITO sputtered layer. The thickness of the electrode 62b may for example be 50 nm.

The mirror 30 may be a multilayer reflective film. The multilayer reflective film may be formed, for example, by alternately depositing and stacking a $Nb_2O_5$ layer and a $SiO_2$ layer. The $Nb_2O_5$ layer has a refractive index n of 2.282. The thickness of the $Nb_2O_5$ layer may for example be approximately 100 nm. The $SiO_2$ layer has a refractive index n of 1.468. The thickness of the $SiO_2$ layer may for example be approximately 200 nm. The mirror 30 has, for example, a total of thirteen layers, namely seven $Nb_2O_5$ layers and six $SiO_2$ layers. The thickness of the mirror 30 may for example be 1.9 μm.

Next, detailed examples of the materials and dimensions of the elastic spacers 77 and the seal member 79 are described.

As the elastic spacers 77, Sekisui Chemical's Micropearl EX-003 may be used, for example. In a state in which the lower structure 100a and the upper structure 100b are yet to be bonded together, the dimension of each of the elastic spaces 77 in the Z direction is for example 3.0 μm. The dimension of each of the elastic spacers 77 is larger than a total of the thickness of each of the partition walls 73 and the thickness of the mirror 30. The thickness of each of the partition walls 73 may for example be 1 μm, and the thickness of the mirror 30 may for example be 1.9 μm.

As the dielectric member 21, 5CB liquid crystal may be used, for example.

As the seal member 79, ThreeBond's ultraviolet-curable adhesive 3026E may be used, for example. For example, the lower structure 100a and the upper structure 100b can be bonded together by curing the seal member 79 by irradiating the seal member 79 with ultraviolet radiation with a wavelength 365 nm and an energy density of 100 mJ/cm². Thus, the optical device 100 according to the present embodiment is obtained.

It should be noted that the substrate 50a and the substrate 50b do not need to be formed from $SiO_2$. The substrate 50a and the substrate 50b may for example be inorganic substrates made of glass or sapphire or resin substrates made of acrylic or polycarbonate. These inorganic substrates or resin substrates have translucency.

The transmittance of the mirror 30, from which light is emitted, is for example 99.9%, and the transmittance of the mirror 40, from which no light is emitted, is for example 99.99%. This condition can be achieved by adjusting the numbers of layers of the multi-layer reflective films. Two layers may be combined into each of the multilayer reflective films. One of the two layers has a refractive index higher than or equal to 2, and the other of the two layers has a refractive index lower than 2. A great difference between the two refractive indices can bring about a high reflectance. The layer having a refractive index higher than or equal to 2 may be formed from at least one selected from the group consisting of $SiN_x$, $AlN_x$, $TiO_x$, $ZrO_x$, $NbO_x$, and $TaO_x$. The layer having a refractive index lower than 2 may be formed from at least one selected from the group consisting of $SiO_x$ and $AlO_x$.

The refractive index of the dielectric layer 51 is for example lower than 2, and the refractive index of each of the optical waveguides 11 is for example higher than or equal to 2. A great difference between the two refractive indices can reduce evanescent light that exudes from the optical waveguide 11 into the dielectric layer 51.

Next, results obtained by measuring gaps in places a to i and α to δ shown in FIG. 9 are described. The gaps were examined by retardation measurement. The measurement involved the use of seventy-five optical waveguides 10. The places a, b, and c or the places g, h, and i are three places on one of the plurality of partition walls 73 that is furthest away from the center. The places d, e, and f are three places on one of the plurality of partition walls 73 that is in the center. The places α to δ are places in four corners of the region surrounded by the seal member 79.

Gaps in the places a to i are gaps between the partition walls 73 and the mirror 30 in the Z direction, and these gaps have a theoretical value of 0 nm. Gaps in the places α to δ are gaps between the dielectric layer 51 and the electrode 62b in the Z direction, and these gaps have a theoretical value of 2.9 μm.

Table 1 shows gaps in the places a to i and α to δ in the absence of the elastic spacers 77.

TABLE 1

| Place | Gap (μm) | Place | Gap (μm) |
|---|---|---|---|
| 1 | 0.082 | α | 2.95 |
| 2 | 0.161 | β | 3.31 |
| 3 | 0.424 | γ | 2.96 |
| 4 | 0.004 | δ | 3.19 |
| 5 | 0.081 | Average | 3.10 |
| 6 | 0.221 | Standard deviation | 0.154 |
| 7 | 0.006 | | |
| 8 | 0.081 | | |
| 9 | 0.251 | | |
| Average | 0.146 | | |
| Standard deviation | 0.128 | | |

In the absence of the elastic spacers 77, the average of the gaps in the places a to i is 0.146 nm, and a standard deviation of the gaps is 0.128 nm. The average of the gaps in the places α to β is 3.10 μm, and a standard deviation of the gaps is 0.154 μm. Accordingly, the average of the gaps deviates comparatively greatly from the aforementioned theoretical value, and variations among the gaps are great, so that the gaps are not uniform.

TABLE 2

| Place | Gap (μm) | Place | Gap (μm) |
|---|---|---|---|
| a | 0.003 | α | 2.94 |
| b | 0.007 | β | 2.94 |
| c | 0.005 | γ | 2.94 |
| d | 0.004 | δ | 2.94 |
| e | 0.009 | Average | 2.94 |
| f | 0.007 | Standard deviation | 0.000 |
| g | 0.003 | | |
| h | 0.006 | | |
| i | 0.006 | | |
| Average | 0.006 | | |
| Standard deviation | 0.002 | | |

Table 2 shows gaps in the places a to i and α to δ in the presence of the elastic spacers 77. In the presence of the elastic spacers 77, the average of the gaps in the places a to i is 0.006 nm, and a standard deviation of the gaps is 0.002 nm. The average of the gaps in the places α to β is 2.94 μm, and a standard deviation of the gaps is 0.000 μm. Accordingly, the average of the gaps is close to the aforementioned theoretical value, and variations among the gaps are sufficiently small, so that it can be said that the gaps are uniform. That is, in the optical device 100 according to the present embodiment, the elastic spacers 77 make it possible to significantly improve the uniformity of the gap between the substrate 50a and the substrate 50b.

In the present embodiment, as shown in FIGS. 12A and 12B, a part of the upper structure 100b is cut away. In the example shown in FIGS. 12A and 12B, the size of the upper structure 100b in the X and Y directions is smaller than the size of the lower structure 100a in the X and Y directions. In this case, an optical device can also be fabricated by placing the elastic spacers 77 only in and around the region surrounded by the seal member 79 shown in FIG. 9 and then bonding the lower and upper structures 100a and 100b shown in FIGS. 12A and 12B together via the elastic spacers 77. The inventor studied and found that in this case, the average of the gaps in the places a to i was 0.01 nm and a standard deviation of the gaps was 0.004 nm. The average of the gaps in the places α to δ was 2.94 μm, and a standard deviation of the gaps was 0.007 μm. Indeed, even in this case, the uniformity of the gap between the substrates 50a and the substrate 50b can be significantly improved. On the other hand, in the optical device 100 according to the present embodiment, as mentioned above, the average of the gaps in the places a to i is 0.006 nm, and a standard deviation of the gaps was 0.002 nm. The average of the gaps in the places α to β is 2.94 μm, and a standard deviation of the gaps is 0.000 μm. Accordingly, using the technology of the present disclosure makes it possible to further improve the uniformity of the gap between the substrate 50a and the substrate 50b.

Further, in the optical device 100 of the present embodiment, the mirror 30 of the upper structure 100b is not formed in a region in which the elastic spacers 77 are formed. Such a configuration makes it possible to ensure a wide gap in the Z direction in a region in which the elastic spacers 77 and the seal member 79 are formed. This prevents the seal member 79 from spreading more than necessary when it is in uncured liquid form. Further, if large particles are sandwiched between the lower structure 100a and the upper structure 100b when the lower structure 100a and the upper structure 100b are bonded together, the post-bonding gap may lack uniformity. Even in this case, the present embodiment can make it possible to make the post-bonding gap uniform, as the gap in the Z direction is large in a peripheral portion into which particles especially easily intrude.

In the region in which the elastic spacers 77 are formed, at least either the mirror 30 or the mirror 40 does not need to be formed. In the aforementioned example, the mirror 30 is not formed. On the other hand, the mirror 40 does not need to be formed. Alternatively, neither the mirror 30 nor the mirror 40 need to be formed.

Figure 13:
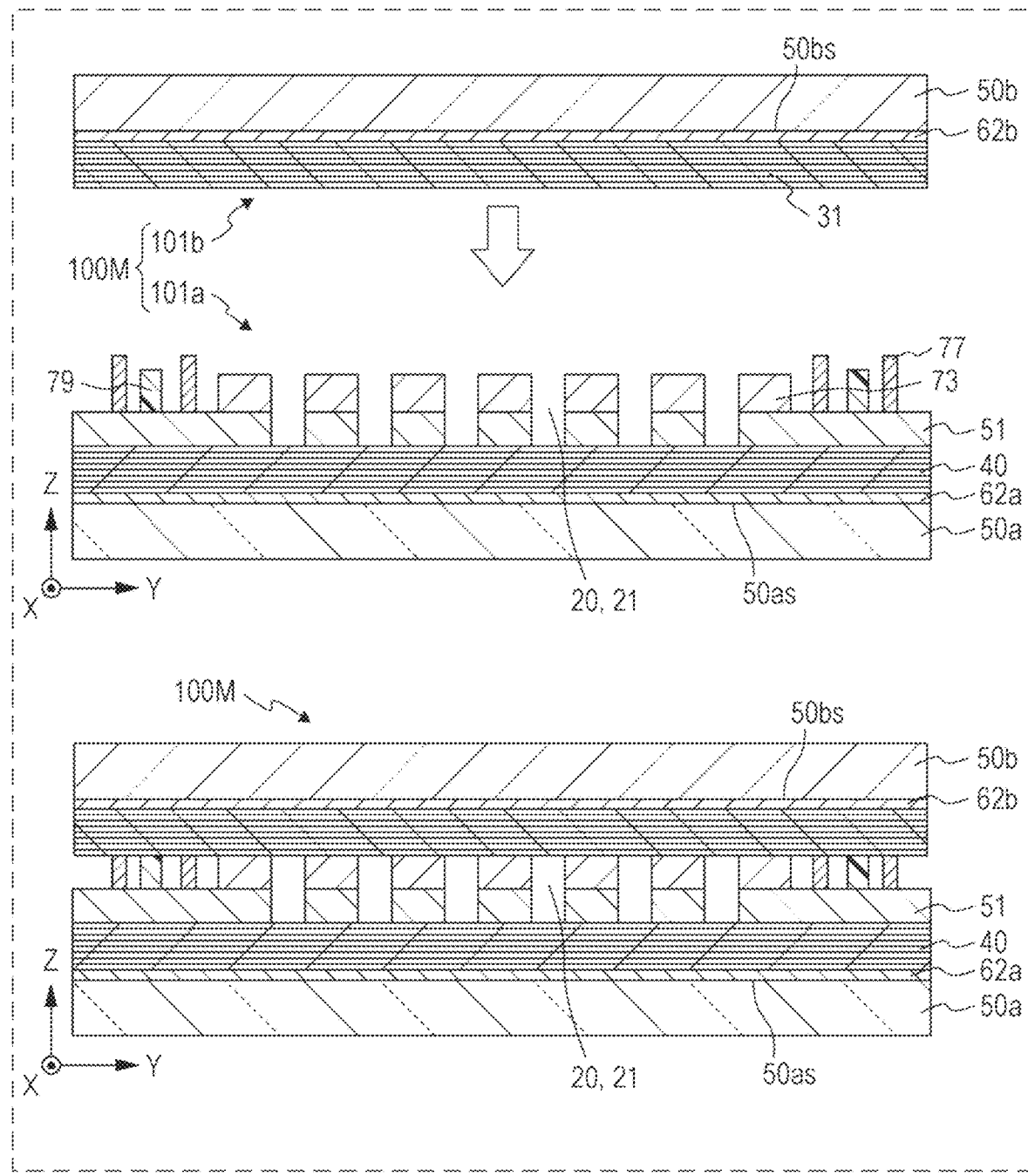
FIG. 13 is a diagram showing a configuration of an optical scan device according to a modification.

Next, a modification of the optical device 100 is described. FIG. 13 is a cross-sectional view schematically showing a configuration of an optical device 100M according to the modification. The cross-section of the optical device 100M shown in FIG. 13 corresponds to the C-C cross-section shown in FIG. 9. The upper drawing of FIG. 13 represents a state in which a lower structure 101a and an upper structure 101b are yet to be bonded together. The lower drawing of FIG. 13 represents a state in which the lower structure 101a and the upper structure 101b have been bonded together. In the aforementioned embodiment, the mirror 30 is not formed in a region in the upper structure 100b in which the elastic spacers 77 are formed. On the other hand, in the present modification, a mirror 31 is also formed in a region in which the elastic spacers 77 are formed. The present modification can significantly reduce interference, i.e. crosstalk, between adjacent waveguides 10.

The following describes a result obtained by measuring light emitted from the optical device 100 according to the present embodiment.

Figure 14:
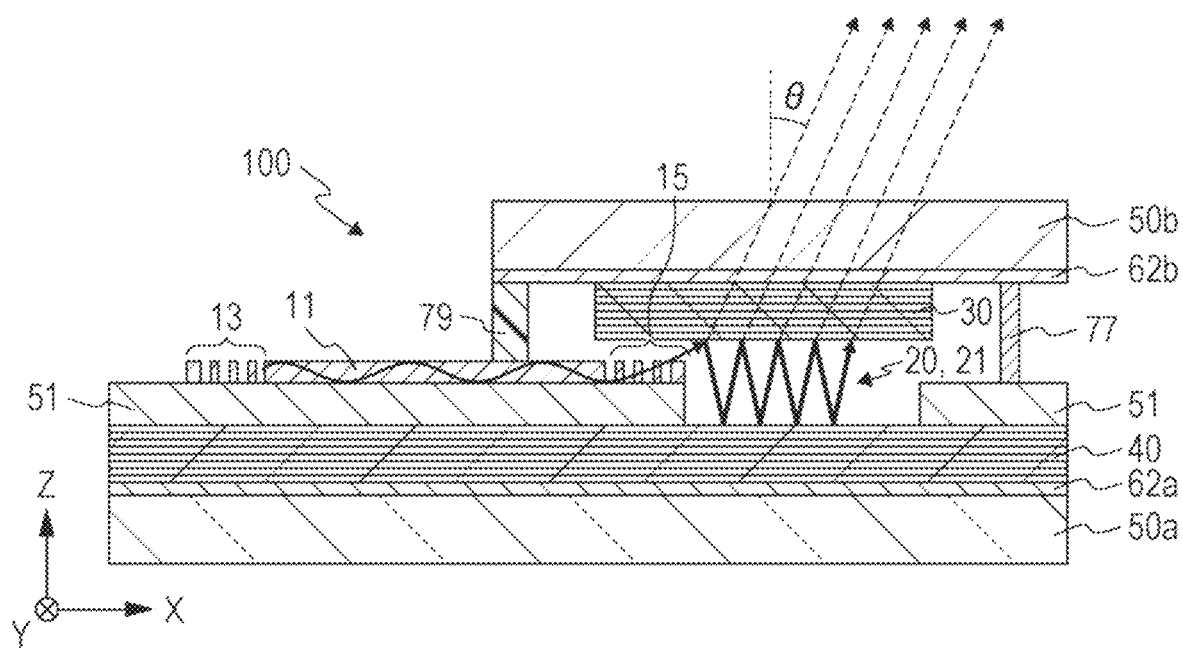
FIG. 14 is a diagram schematically showing emission of light from the optical device.

FIG. 14 is a diagram schematically showing emission of light from the optical device 100. In the example shown in FIG. 14, light emitted from the optical device 100 was measured by a photodetector (not illustrated) fixed in an orientation at an angle of emission θ of 60 degrees. In the measurement, laser light at 589 nm was inputted to each optical waveguide 11 via the grating 13. It was found that in the presence of the elastic spacers 77, the intensity of the light thus measured is approximately 100 to 1000 times higher than in the absence of the elastic spacers 77. That is, in the optical device 100 according to the present embodiment, the elastic spacers 77 make it possible to significantly improve the intensity of light that is emitted and the accuracy of the angle of emission.

Manufacturing Method

The following describes an example of a method for manufacturing the aforementioned optical device 100.

Figure 15:
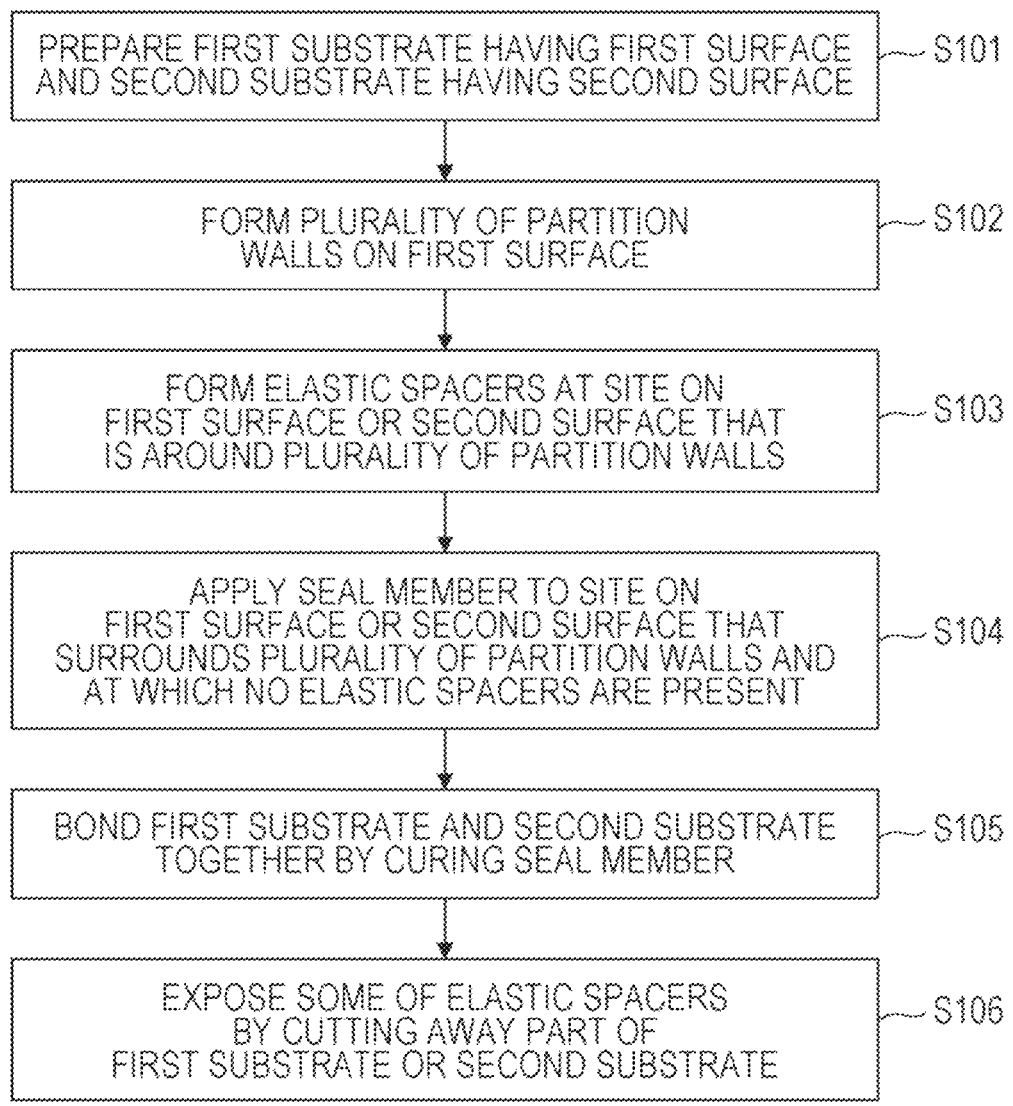
FIG. 15 is a flow chart showing a process of manufacturing an optical device.

FIG. 15 is a flow chart showing a process of manufacturing an optical device 100. The method for manufacturing an optical device 100 in this example includes the following steps S101 to S106.

In step S101, a substrate 50a having a first surface 50as and a substrate 50b having a second surface 50bs are prepared. In step S102, a plurality of partition walls 73 are formed on the first surface 50as. In step S103, elastic spacers 77 are formed at a site on the first surface 50as or the second surface 50bs located around the plurality of partition walls 73 in the finished optical device 100. In step S104, a seal member 79 is applied to a site on the first surface 50as or the second surface 50bs that surrounds the plurality of partition walls 73 in the finished optical device 100 and at which no elastic spacers 77 are present. In step S105, the substrate 50a and the substrate 50b are bonded together by curing the seal member 79 with the seal member 79 in close contact with the first surface 50as and the second surface 50bs. In step S106, a part of one of the substrates 50a and 50b on which the elastic spacers 77 are not provided is cut away, so that some of the elastic spacers 77 are exposed.

Step S102 may be followed by the step of providing a plurality of dielectric members 21 between the plurality of partition walls 73. In a case where the dielectric members 21 contain a liquid crystal material, step S105 may be followed by the step of injecting the plurality of dielectric members 21 into spaces between the plurality of partition walls 73.

The foregoing method makes it possible to fabricate the optical device 100.

Examples of Application

Figure 16:
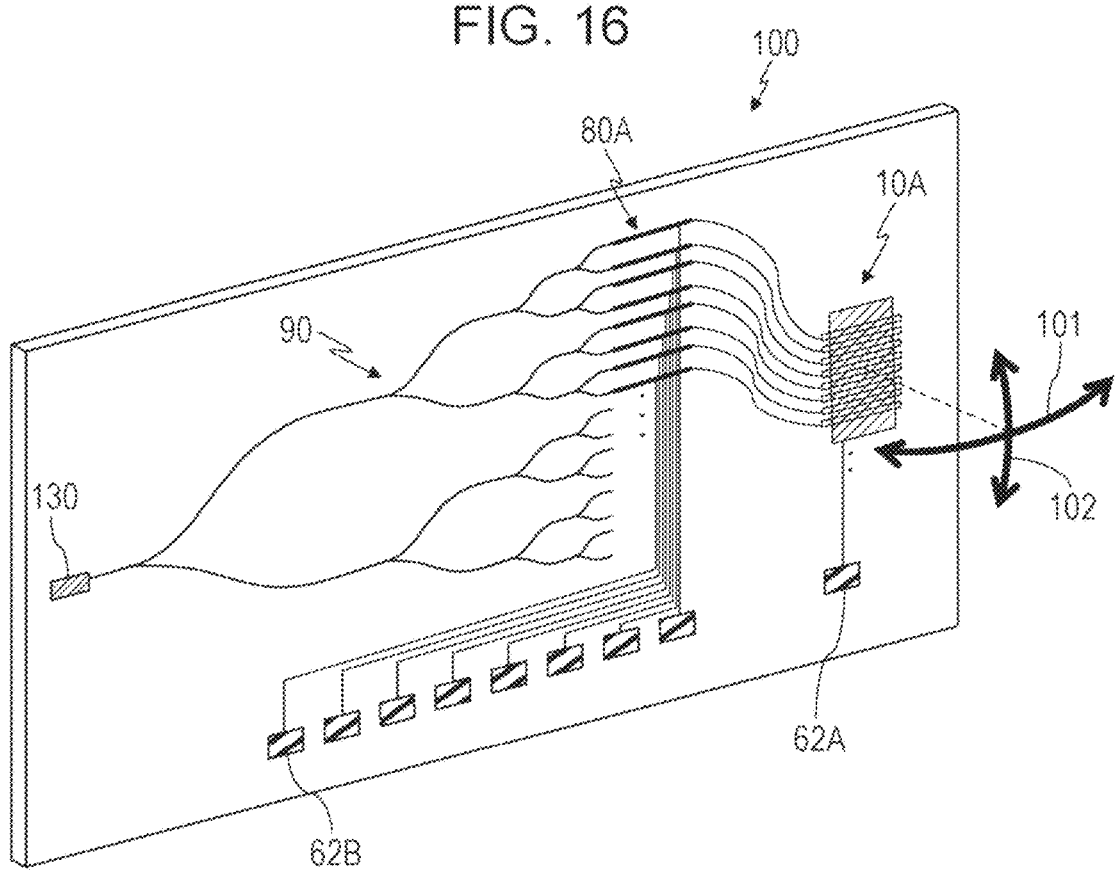
FIG. 16 is a diagram showing an example configuration of an optical scan device in which elements such as an optical divider, a waveguide array, a phase shifter array, and a light source are integrated on a circuit board.

FIG. 16 is a diagram showing an example configuration of an optical scan device 100 in which elements such as an optical divider 90, a waveguide array 10A, a phase shifter array 80A, and a light source 130 are integrated on a circuit board (e.g. a chip). The light source 130 may for example be a light-emitting element such as a semiconductor laser. In this example, the light source 130 emits single-wavelength light whose wavelength in free space is λ. The optical divider 90 divides the light from the light source 130 into lights and introduces the lights into waveguides of the plurality of phase shifters 80. In the example shown in FIG. 11, there are provided an electrode 62A and a plurality of electrodes 62B on the chip. The waveguide array 10A is supplied with a control signal from the electrode 62A. To the plurality of phase shifters 80 in the phase shifter array 80A, control signals are sent from the plurality of electrodes 62B, respectively. The electrode 62A and the plurality of electrodes 62B may be connected to a control circuit (not illustrated) that generates the control signals. The control circuit may be provided on the chip shown in FIG. 11 or may be provided on another chip in the optical scan device 100.

As shown in FIG. 16, an optical scan over a wide range can be achieved through a small-sized device by integrating all components on the chip. For example, all of the components shown in FIG. 11 can be integrated on a chip measuring approximately 2 mm by 1 mm.

Figure 17:
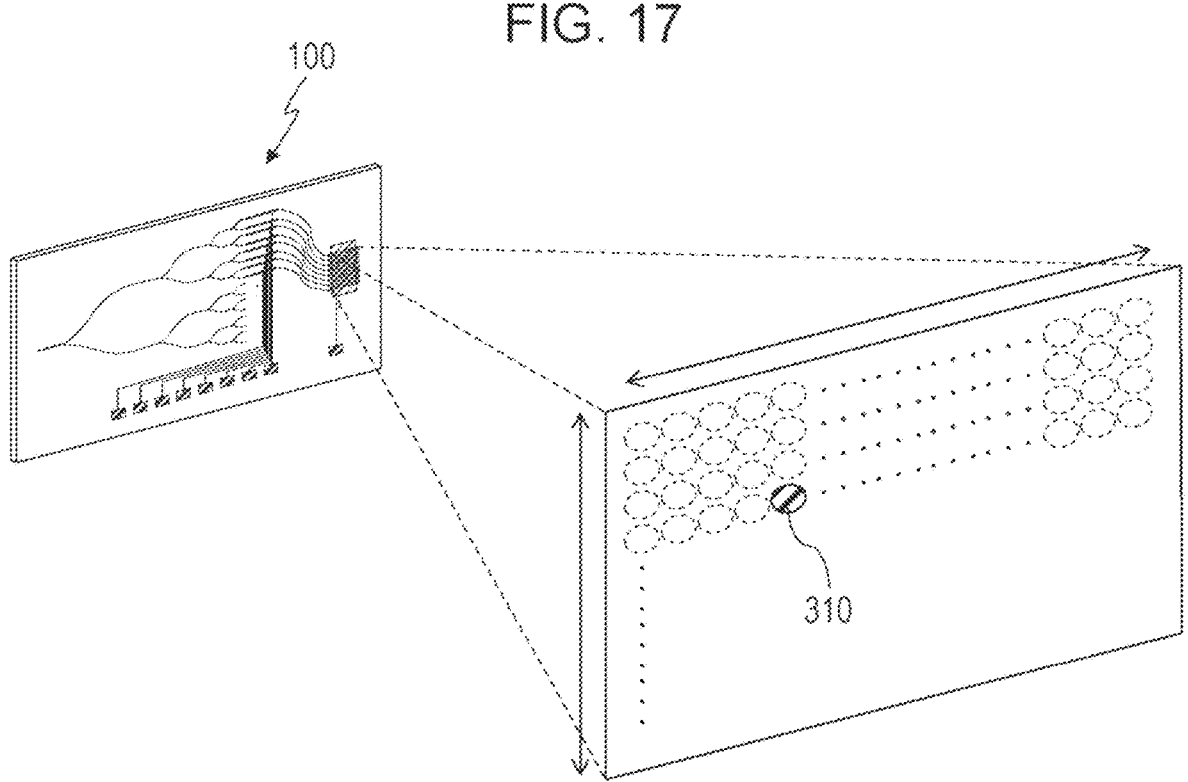
FIG. 17 is a schematic view showing how a two-dimensional scan is being executed by irradiating a distant place with a light beam such as a laser from the optical scan device.

FIG. 17 is a schematic view showing how a two-dimensional scan is being executed by irradiating a distant place with a light beam such as a laser from the optical scan device 100. A two-dimensional can is executed by moving a beam spot 310 in horizontal and vertical directions. For example, a two-dimensional ranging image can be acquired by a combination with a publicly-known TOF (time-of-flight) method. The TOF method is a method for, by observing light reflected from a physical object irradiated with a laser, calculating the time of flight of the light to figure out the distance.

Figure 18:
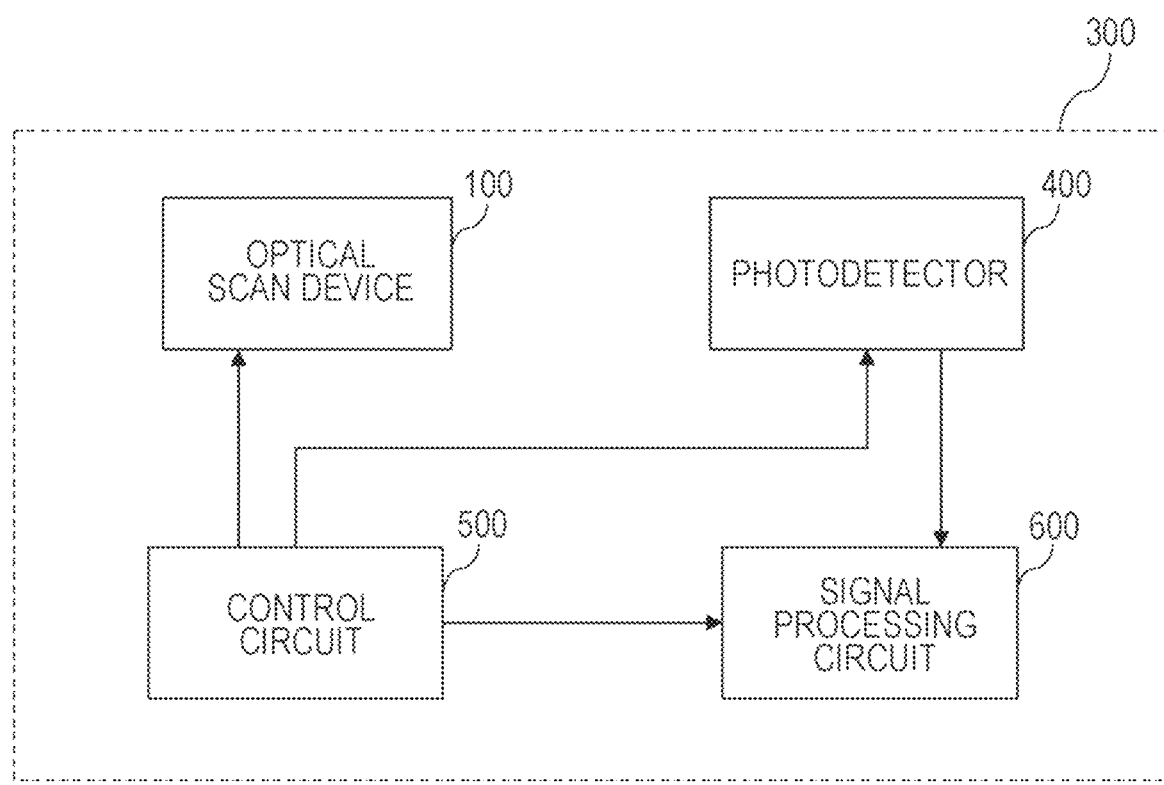
FIG. 18 is a block diagram showing an example configuration of a LiDAR system that is capable of generating a ranging image.

FIG. 18 is a block diagram showing an example configuration of a LiDAR system 300 serving as an example of a photodetection system that is capable of generating such a ranging image. The LiDAR system 300 includes an optical scan device 100, a photodetector 400, a signal processing circuit 600, and a control circuit 500. The photodetector 400 detects light emitted from the optical scan device 100 and reflected from a physical object. The photodetector 400 may for example be an image sensor that has sensitivity to the wavelength λ of light that is emitted from the optical scan device 100 or a photodetector including a photo-sensitive element such as a photodiode. The photodetector 400 outputs an electrical signal corresponding to the amount of light received. The signal processing circuit 600 calculates the distance to the physical object on the basis of the electrical signal outputted from the photodetector 400 and generates distance distribution data. The distance distribution data is data that represents a two-dimensional distribution of distance (i.e. a ranging image). The control circuit 500 is a processor that controls the optical scan device 100, the photodetector 400, and the signal processing circuit 600. The control circuit 500 controls the timing of irradiation with a light beam from the optical scan device 100 and the timing of exposure and signal readout of the photodetector 400 and instructs the signal processing circuit 600 to generate a ranging image.

The frame rate at which a ranging image is acquired by a two-dimensional scan can be selected, for example, from among 60 fps, 50 fps, 30 fps, 25 fps, 24 fps, or other frame rates, which are commonly used to acquire moving images. Further, in view of application to an onboard system, a higher frame rate leads to a higher frequency of acquisition of a ranging image, making it possible to accurately detect an obstacle. For example, in the case of a vehicle traveling at 60 km/h, a frame rate of 60 fps makes it possible to acquire an image each time the vehicle moves approximately 28 cm. A frame rate of 120 fps makes it possible to acquire an image each time the vehicle moves approximately 14 cm. A frame rate of 180 fps makes it possible to acquire an image each time the vehicle moves approximately 9.3 cm.

The time required to acquire one ranging image depends on the speed of a beam scan. For example, in order for an image whose number of resolvable spots is 100 by 100 to be acquired at 60 fps, it is necessary to perform a beam scan at 1.67 μs per point. In this case, the control circuit 500 controls the emission of a light beam by the optical scan device 100 and the storage and readout of a signal by the photodetector 400 at an operating speed of 600 kHz.

Example of Application to Optical Receiver Device

Each of the optical scan devices according to the aforementioned embodiments of the present disclosure can also be used as an optical receiver device of similar configuration. The optical receiver device includes a waveguide array 10A which is identical to that of the optical scan device and a first adjusting element that adjusts the direction of light that can be received. Each of the first mirrors 30 of the waveguide array 10A transmits light falling on a side thereof opposite to a first reflecting surface from the third direction. Each of the optical waveguide layers 20 of the waveguide array 10A causes the light transmitted through the first mirror 30 to propagate in the second direction. The direction of light that can be received can be changed by the first adjusting element changing at least one of the refractive index of the optical waveguide layer 20 of each waveguide element 10, the thickness of the optical waveguide layer 20 of each waveguide element 10, or the wavelength of light. Furthermore, in a case where the optical receiver device includes a plurality of phase shifters 80 or 80a and 80b which are identical to those of the optical scan device and a second adjusting element that varies differences in phase among lights that are outputted through the plurality of phase shifters 80 or 80a and 80b from the plurality of waveguide elements 10, the direction of light that can be received can be two-dimensionally changed.

For example, an optical receiver device can be configured such that the light source 130 of the optical scan device 100 shown in FIG. 16 is substituted by a receiving circuit. When light of wavelength λ falls on the waveguide array 10A, the light is sent to the optical divider 90 through the phase shifter array 80A, is finally concentrated on one place, and is sent to the receiving circuit. The intensity of the light concentrated on that one place can be said to express the sensitivity of the optical receiver device. The sensitivity of the optical receiver device can be adjusted by adjusting elements incorporated separately into the waveguide array 10A and the phase shifter array 80A. The optical receiver device is opposite in direction of the wave number vector (in the drawing, the bold arrow) shown, for example, in FIG. 4. Incident light has a light component acting in the direction (in the drawing, the X direction) in which the waveguide elements 10 extend and a light component acting in the array direction (in the drawing, the Y direction) of the waveguide elements 10. The sensitivity to the light component acting in the X direction can be adjusted by the adjusting element incorporated into the waveguide array 10A. Meanwhile, the sensitivity to the light component acting in the array direction of the waveguide elements 10 can be adjusted by the adjusting element incorporated into the phase shifter array 80A. θ and $\alpha_0$ shown in FIG. 4 are found from the phase difference Δφ of light and the refractive index $n_w$ and thickness d of the optical waveguide layer 20 at which the sensitivity of the optical receiver device reaches its maximum. This makes it possible to identify the direction of incidence of light.

Based on the above, the following summarizes the configuration and operation of the optical device 100 according to the present embodiment as an optical scan device or an optical receiver device with reference to the example shown in FIGS. 12A and 12B.

In the optical device 100 according to the present embodiment, the plurality of dielectric members 21 contain a liquid crystal material or an electro-optical material. The plurality of dielectric members 21 are sandwiched between the pair of electrodes 62a and 62b for the application of a voltage. That is, the plurality of optical waveguides 10 include a structure that is capable of adjusting the refractive indices of the plurality of dielectric members 21.

In a case where the optical device 100 according to the present embodiment is used as an optical scan device, the direction of light that is emitted via the substrate 50a or the substrate 50b from the plurality of optical waveguides 10 is changed by adjusting the refractive indices of the plurality of dielectric members 21. More specifically, an X-direction component of a wave number vector of the light is changed.

In a case where the optical device 100 according to the present embodiment is used as an optical receiver device, the direction of incidence of light that is taken into the plurality of optical waveguides 10 via the substrate 50a or the substrate 50b is changed by adjusting the refractive indices of the plurality of dielectric members 21. More specifically, an X-direction component of a wave number vector of the light is changed.

The optical device 100 according to the present embodiment may further include a plurality of phase shifters 80 connected either directly or via other waveguides to the plurality of optical waveguides 10, respectively. When the number of optical waveguides 10 is 1, the number of phase shifters 80 is 1, too.

In a case where the optical device 100 according to the present embodiment is used as an optical scan device, the direction of light that is emitted via the substrate 50a or the substrate 50b from the plurality of optical waveguides 10 is changed by varying differences among the phases of lights passing through the plurality of phase shifters 80. More specifically, a Y-direction component of a wave number vector of the light is changed.

In a case where the optical device 100 according to the present embodiment is used as an optical receiver device, the direction of incidence of light that is taken into the plurality of optical waveguides 10 via the substrate 50a or the substrate 50b is changed by varying differences in phase among lights passing through the plurality of phase shifters 80. More specifically, a Y-direction component of a wave number vector of the light is changed.

The aforementioned embodiments can be combined as appropriate.

An optical scan device and an optical receiver device according to an embodiment of the present disclosure are applicable, for example, to a use such as a LiDAR system that is mounted on a vehicle such as an automobile, a UAV, or an AGV.

What is claimed is:
1. An optical device comprising:
  a first substrate having a first surface spreading along a first direction and a second direction intersecting the first direction;
  a second substrate having a second surface that at least partially faces the first surface and that has a different area from an area of the first surface;
  at least one optical waveguide extending along the first direction between the first substrate and the second substrate; and
  a plurality of elastic spacers, disposed on at least either the first surface or the second surface, that include a first portion and a second portion, wherein:
  the first portion of the plurality of elastic spacers is at least one elastic spacer located in a region between the first substrate and the second substrate in which the first substrate and the second substrate overlap each other as seen from an angle parallel with a direction perpendicular to the first surface, the second portion of the plurality of elastic spacers is at least one elastic spacer located in a region in which the first substrate and the second substrate do not overlap each other as seen from an angle parallel with the direction perpendicular to the first surface, each of the at least one optical waveguide includes a first portion disposed in a region between the first substrate and the second substrate in which the first substrate and the second substrate overlap each other and a second portion disposed in a region in which the first substrate and the second substrate do not overlap each other, the at least one optical waveguide comprises a plurality of optical waveguides, and at least a part of the second portion of the plurality of elastic spacers is located around the second portion of each of the plurality of optical waveguides.

2. The optical device according to claim 1, further comprising a plurality of partition walls, arranged in the second direction between the first substrate and the second substrate, each of which extends along the first direction, wherein a modulus of elasticity of each of the plurality of elastic spacers is smaller than a modulus of elasticity of each of the plurality of partition walls.

3. The optical device according to claim 2, wherein the plurality of partition walls are directly or indirectly sandwiched between the first substrate and the second substrate, and a ratio with which each of the plurality of elastic spacer deforms in the direction perpendicular to the first surface by being sandwiched between the first substrate and the second substrate is higher than a ratio with which each of the plurality of partition walls deforms in the perpendicular direction by being sandwiched between the first substrate and the second substrate.

4. The optical device according to claim 1, wherein each of the plurality of elastic spacers has a columnar shape.

5. The optical device according to claim 1, wherein each of the at least one optical waveguide includes a third portion located between two adjacent partition walls and includes a first grating in the third portion.

6. The optical device according to claim 5, wherein each of the at least one optical waveguide includes a second grating in the second portion of the plurality of elastic spacers.

7. The optical device according to claim 1, further comprising a seal member that fixes a gap between the first substrate and the second substrate, wherein the at least one optical waveguide has a structure in which one or more first optical waveguides and one or more second optical waveguides are connected to each other, respectively, and the seal member surrounds the one or more first optical waveguides when seen from an angle parallel with the direction perpendicular to the first surface.

8. The optical device according to claim 7, wherein the one or more first optical waveguides each include one or more dielectric members extending along the first direction, and a region surrounded by the seal member between the first substrate and the second substrate is filled with a member that is identical to the one or more dielectric members.

9. The optical device according to claim 8, wherein the one or more first optical waveguides include a structure that is capable of adjusting refractive indices of the one or more dielectric members, and a direction of light that is emitted via the first substrate or the second substrate from the one or more first optical waveguides or a direction of incidence of light that is taken into the one or more first optical waveguides via the first substrate or the second substrate is changed by adjusting the refractive indices of the one or more dielectric members.

10. The optical device according to claim 9, further comprising a pair of electrodes between which the one or more dielectric members are sandwiched, wherein the one or more dielectric members contain a liquid crystal material or an electro-optical material, and the refractive indices of the one or more dielectric members are adjusted by applying a voltage to the pair of electrodes.

11. The optical device according to claim 10, further comprising one or more phase shifters connected either directly or via other waveguides to the one or more first optical waveguides, respectively, wherein the direction of the light that is emitted via the first substrate or the second substrate from the one or more first optical waveguides or the direction of incidence of the light that is taken into the one or more first optical waveguides via the first substrate or the second substrate is changed by varying differences in phase among lights passing through the one or more phase shifters.

12. The optical device according claim 1, wherein the one or more first optical waveguides each include one or more dielectric members extending along the first direction, the optical device further comprising two mirrors located between the first substrate and the one or more dielectric members and between the second substrate and the one or more dielectric members, respectively.

13. The optical device according to claim 12, wherein at least a part of the first portion of the plurality of elastic spacers is located outside a region sandwiched between the two mirrors.

14. A photodetection system comprising:

the optical device according to claim 1;

a photodetector that detects light emitted from the optical device and reflected from a physical object; and a signal processing circuit that generates distance distribution data based on an output from the photodetector.

* * * * *